US012711925B2

(12) United States Patent
Pyun et al.

(10) Patent No.: US 12,711,925 B2
(45) Date of Patent: Aug. 18, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Ki Hyun Pyun, Yongin-si (KR); Jung Eon An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/092,204

(22) Filed: Mar. 27, 2025

(65) Prior Publication Data

US 2026/0018138 A1 Jan. 15, 2026

(30) Foreign Application Priority Data

Jul. 15, 2024 (KR) ........................ 10-2024-0093157

(51) Int. Cl.
*G09G 3/3275* (2016.01)
*G09G 3/32* (2016.01)

(52) U.S. Cl.
CPC ............. *G09G 3/3275* (2013.01); *G09G 3/32* (2013.01); *G09G 2310/0275* (2013.01); *G09G 2310/08* (2013.01); *G09G 2330/023* (2013.01)

(58) Field of Classification Search
CPC ................... G09G 3/3275; G09G 3/32; G09G 2310/0275; G09G 2310/08; G09G 2330/023
See application file for complete search history.

(56) References Cited

U.S. PATENT DOCUMENTS

| | | | | |
|---|---|---|---|---|
| 9,135,859 | B2 | 9/2015 | Lee et al. | |
| 9,569,997 | B2 | 2/2017 | An | |
| 10,297,184 | B2 | 5/2019 | Jeong et al. | |
| 11,263,961 | B2 | 3/2022 | Kang | |
| 11,349,392 | B2 | 5/2022 | Kim et al. | |
| 11,605,331 | B2 * | 3/2023 | Pyun | G09G 3/2092 |
| 2016/0125791 | A1 * | 5/2016 | Park | H02M 3/1584 345/76 |
| 2020/0380913 | A1 * | 12/2020 | Ryu | G09G 3/3208 |
| 2022/0254300 | A1 * | 8/2022 | Pyun | G09G 3/3233 |
| 2022/0319439 | A1 * | 10/2022 | Pyun | G09G 3/3233 |

FOREIGN PATENT DOCUMENTS

| | | | |
|---|---|---|---|
| KR | 10-1957152 | B1 | 6/2019 |
| KR | 10-1970561 | B1 | 8/2019 |
| KR | 10-2206232 | B1 | 1/2021 |
| KR | 10-2294633 | B1 | 8/2021 |
| KR | 10-2338946 | B1 | 12/2021 |
| KR | 10-2022-0134806 | A | 10/2022 |
| KR | 10-2630591 | B1 | 1/2024 |
| KR | 10-2701259 | B1 | 9/2024 |

* cited by examiner

*Primary Examiner* — Andrew Sasinowski
(74) *Attorney, Agent, or Firm* — F. CHAU & ASSOCIATES, LLC

(57) ABSTRACT

A display device includes a display panel, a power supply, and a power controller. The power supply receives a first power voltage through an input terminal and outputs a second power voltage supplied to the display panel to an output terminal. The power controller varies an allowable current of the power supply by comparing a current output through the output terminal with a reference current.

18 Claims, 15 Drawing Sheets

On: Activated
Off: Deactivated

| | SW1 | SW2 | SW3 | SW4 | Allowable Current |
|---|---|---|---|---|---|
| CASE1 | On | On | On | On | 4X |
| CASE2 | On | On | On | Off | 3X |
| CASE2 | On | On | Off | Off | 2X |
| CASE4 | On | Off | Off | Off | X |

FIG. 15

| Mode | Luminance P/W | Min SF | Luminance F/W | Max Current | Power supply operation (allowable current per 1-Phase : 8A) |
|---|---|---|---|---|---|
| MODE1 | 1000nit | 0.4 | 400nit | 32A | 4-Phase operation (SW1,2,3,4 active) |
| MODE2 | | 0.3 | 300nit | 24A | 3-Phase operation (SW1,2,3 active) |
| MODE3 | | 0.2 | 200nit | 16A | 2-Phase operation (SW1,2 active) |
| MODE4 | | 0.1 | 100nit | 8A | 1-Phase operation (SW1 active) |

DISPLAY DEVICE AND ELECTRONIC DEVICE INCLUDING THE SAME

This application claims priority to Korean Patent Application No. 10-2024-0093157, filed on Jul. 15, 2024, and all the benefits accruing therefrom under 35 U.S.C. § 119, the contents of which in its entirety is herein incorporated by reference.

BACKGROUND

1. Field

The disclosure relates to a display device and an electronic device including the same.

2. Description of the Related Art

A variety of display devices have been developed. These display devices typically include a data driver, a gate driver, and a display panel including pixels. The data driver provides data signals to the pixels through corresponding data lines. The data driver generates the data signals based on input image data and provides the data signals to the pixels. The gate driver provides scan signals to the pixels. Each pixel may write a corresponding data signal in a storage device (e.g., a storage capacitor) in response to a scan signal. Each pixel may then emit light with a luminance corresponding to a current amount flowing through the pixel based on the data signal.

SUMMARY

One or more embodiments described herein relate to a display device that has reduced power consumption.

One or more embodiments described herein achieve the aforementioned reduction in power consumption by limiting current flowing through a display panel corresponding to a calculated load of input image data.

One or more embodiments described herein may reduce power loss in a display device by adjusting the maximum number of activated converters of a power supply corresponding to a maximum current limited by a current limit function.

One or more embodiments described herein performs a current limit function to prevent an overcurrent condition in the display device, which, in turn, may reduce power consumption.

Objects of the disclosure are not limited to the object described above, and other technical objects which are not described may be clearly understood by those skilled in the art from the following description.

According to embodiments, a display device includes a display panel including a pixel, a power supply configured to receive a first power voltage through an input terminal and output a second power voltage supplied to the display panel to an output terminal, and a power controller configured to vary an allowable current of the power supply by comparing a current output through the output terminal with a reference current to vary an allowable current of the power supply.

The power controller may decrease the allowable current of the power supply in response to the current exceeding the reference current.

The power controller may further adjust the allowable current based on a change rate of the current.

The power controller may further reduce the allowable current as the change rate of the current decreases.

The power supply may include converters mutually connected in parallel between the input terminal and the output terminal, the power controller may adjust the number of activated converters among the converters by comparing the current with the reference current, and the allowable current of the power supply may be varied according to the number of the activated converters.

Each of the converters may include at least one transistor and at least one inductor, switching control signals having the same waveform and different phases may be applied to the activated converters, and the at least one transistor may be toggled in response to a corresponding switching control signal among the switching control signals.

The power supply may include four converters mutually connected in parallel.

The power controller may sense the current using a current sensor, and may reduce the number of the activated converters in response to the current exceeding the reference current.

The power controller may adjust the number of the activated converters based on the change rate of the current.

The power controller may further reduce the number of the activated converters as the change rate of the current decreases.

The display panel may display a frame image for each frame period, the power controller may calculate a time between a time point when the current exceeds the reference current and a start time point of the frame period using a counter, and the power supply may further reduce the number of the activated converters as the time increases.

The display may further include a controller configured to output image data corresponding to input image data, and a data driver configured to provide a data signal corresponding to the image data to the pixel, and the controller may convert the input image data into the image data using a scaling factor, and may set the scaling factor so that the current according to the input image data does not exceed the reference current.

The controller may set the scaling factor based on input image data of a first time point, may convert input image data of a second time point after the first time point into the image data using the scaling factor, and the power supply may adjust the number of the activated converters in a period between the first time point and the second time point.

The power controller may adjust the maximum number of the activated converters among the converters based on the reference current.

According to embodiments, an electronic device includes a processor configured to provide input image data, a display device configured to display an image based on the input image data, and a power supply device configured to supply power to the display device. The display device includes a display panel including a pixel, a power supply configured to receive a first power voltage through an input terminal and output a second power voltage supplied to the display panel to an output terminal, and a power controller configured to vary an allowable current of the power supply by comparing a current output through the output terminal with a reference current.

The power supply may include converters mutually connected in parallel between the input terminal and the output terminal, the power controller may adjust the number of activated converters among the converters by comparing the current with the reference current, and the allowable current of the power supply may be varied according to the number of the activated converters.

The power controller may sense the current using a current sensor, and may reduce the number of the activated converters in response to the current exceeding the reference current.

The processor may provide information on the reference current to the display device, and the power controller may adjust the maximum number of the activated converters among the converters based on the reference current.

According to embodiments, a display device includes a display panel including a pixel, a controller configured to output image data corresponding to input image data, a data driver configured to provide a data signal corresponding to the image data to the pixel, and a power supply configured to receive a first power voltage through an input terminal and output a second power voltage supplied to the display panel to an output terminal. The controller converts the input image data into the image data using a scaling factor, and sets the scaling factor so that a current according to the input image data does not exceed a reference current. The power supply varies an allowable current of the power supply based on the reference current.

The power supply may include converters mutually connected in parallel between the input terminal and the output terminal, and the allowable current of the power supply may be varied according to the number of activated converters among the converters.

Specific details of other embodiments are included in the detailed description and drawings.

The display device and the electronic device according to embodiments of the disclosure may reduce the allowable current (sourcing capability, or the number of the activated converters) of the power supply when an overcurrent or an inrush current is supplied from the power supply to the display unit. In this case, voltage drop occurs in a power voltage supplied from the power supply to the display unit, and power consumption may be reduced.

In addition, the display device and the electronic device may limit the sourcing capability of the power supply or the number of the activated converters to supply a current optimized for a current limiting function (controlled data bit). In this case, an unnecessary operation of a converter in the power supply and power loss caused thereby may be reduced or improved.

An effect according to embodiments is not limited to the content exemplified above, and more various effects are included in this specification.

BRIEF DESCRIPTION OF THE DRAWINGS

The above and other features of the disclosure will become more apparent by describing in further detail embodiments thereof with reference to the accompanying drawings, in which:

FIG. 15 is a diagram illustrating an example of how the power controller of FIGS. 13 and 14 may operate;

DETAILED DESCRIPTION OF THE EMBODIMENT

Figure 1:
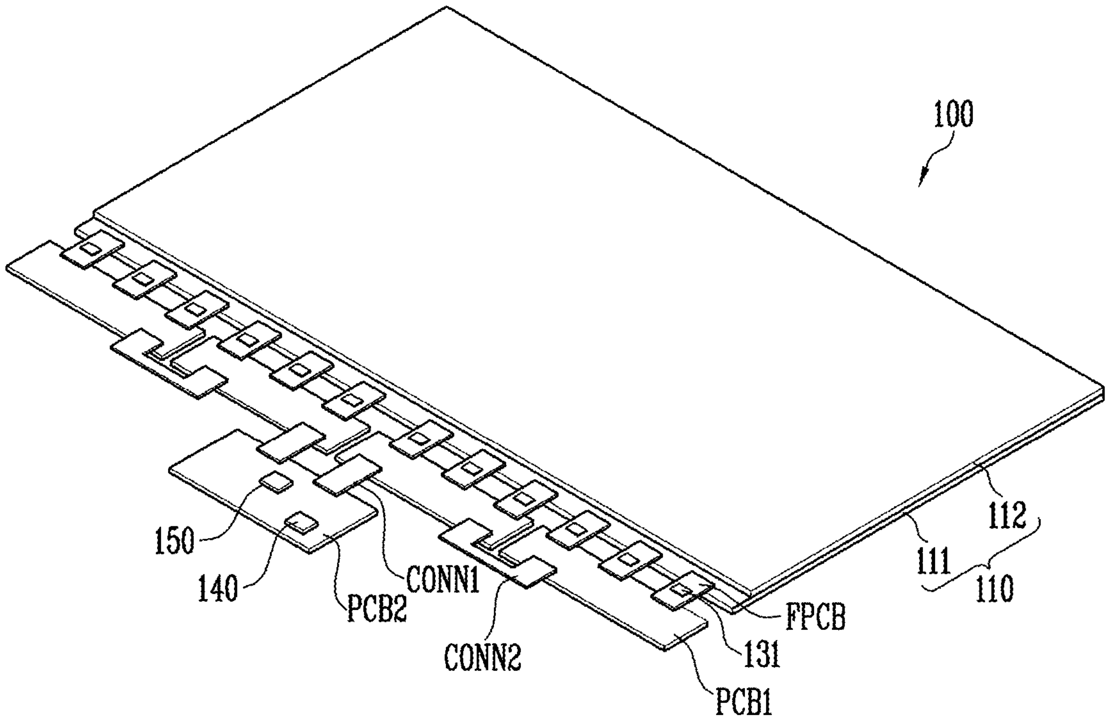
FIG. 1 is a perspective view illustrating a display device according to embodiments.

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of “first”, “second”, and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

Display devices may include power circuits that supply power to a display panel. As these devices are presently configured, power is supplied without consideration of input image load (or current) that is input into the display panel. The current may be excessive in some cases. For example, when input image data to be displayed has a large load, current of the panel may increase. If not regulated, the increased current (or overcurrent condition) may increase power consumption. Further, a data conversion operation is not performed to reduce current when an overcurrent condition is detected. As a result, images which have a high load cause the display panel to consume large amounts of power, which degrades efficiency.

In accordance with one or more embodiments, a power management circuit is included in a display panel which takes into consideration the load of an image to be displayed. When the load reaches a certain amount (e.g., when the load and thus current exceeds a reference amount due to the high load of input image data), a current limit operation is performed to reduce power supplied to the panel.

In one embodiment, the display device may reduce power consumption by using NPC (Net Power Control) technology. For example, the display device may calculate a load based on the input image data, reset the load according to the NPC (or current) limit, and downscale the input image data to generate output image data with reduced load (and thus current) requirements. The NPC limit may, for example, be a value obtained by multiplying a brightness (or a current) by the load (or the load to be reset).

In one embodiment, the display device may use an interleaved buck circuit to generate the current for the display panel. The interleaved buck circuit may be controlled to activate all or a portion of a plurality of buck stages to meet the current limit when load exceeds a certain amount. For example, the display device may reduce the number of activated bucks of the interleaved buck circuit when an overcurrent occurs. When an overcurrent occurs, the number of activated bucks may reduced from a first number (e.g., 4) to a lesser number, e.g., 1 or 2. As a result, power consumption can be reduced.

Hereinafter, a display device according to an embodiment of the disclosure is described with reference to drawings related to embodiments of the disclosure.

Figure 2:
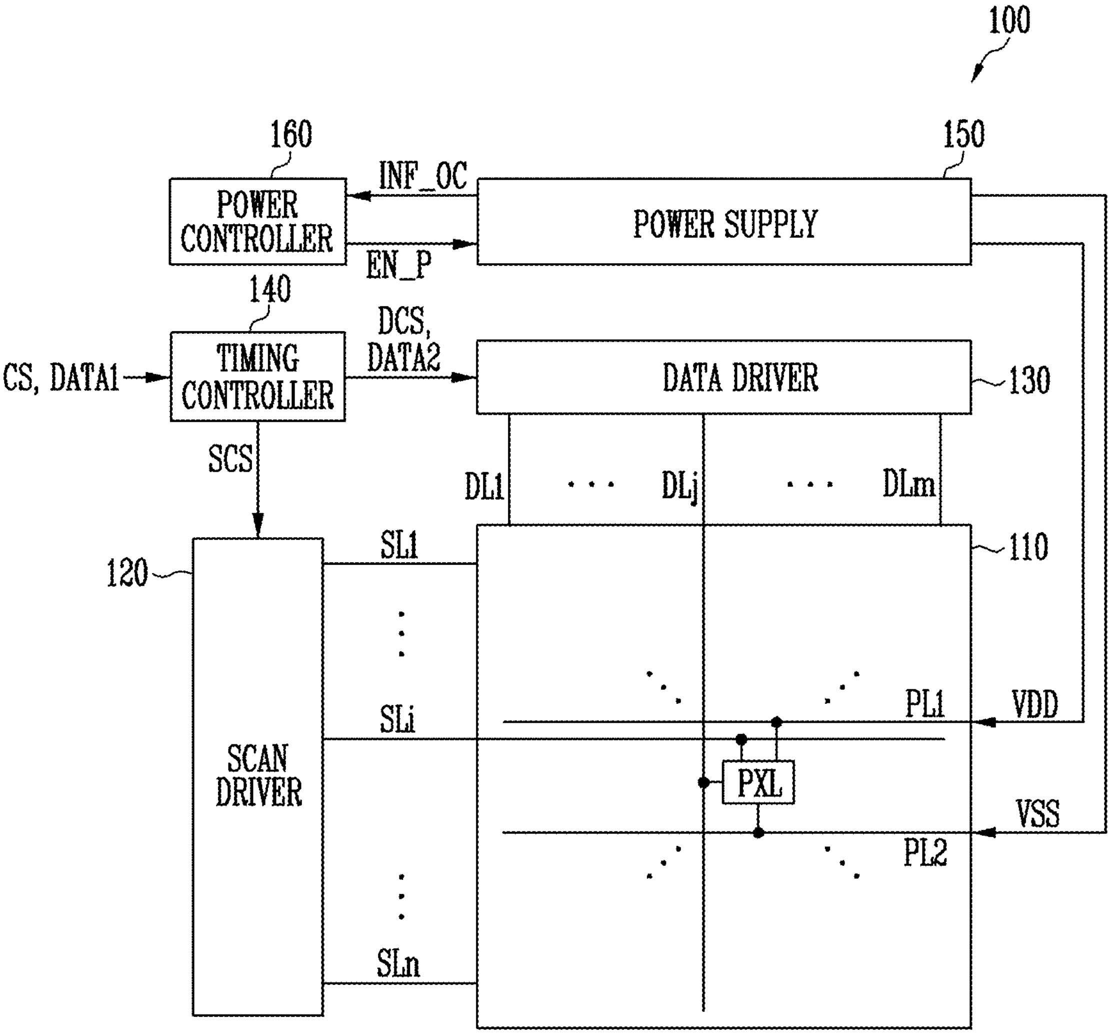
FIG. 2 is a block diagram illustrating an embodiment of the display device of FIG. 1.

FIG. 1 is a perspective view illustrating a display device 100 according to embodiments. FIG. 2 is a block diagram illustrating an embodiment of the display device 100 of FIG. 1.

Referring to FIGS. 1 and 2, the display device 100 may include a display unit 110 (or a display panel), a scan driver 120 (or a gate driver), a data driver 130 (or a source driver), a timing controller 140, a power supply 150, and a power controller 160. The scan driver 120, the data driver 130, the timing controller 140, the power supply 150, and the power controller 160 are directly or indirectly coupled to the display unit 110, and may collectively configure a driving device that drives the display unit 110.

The display unit 110 may display still and moving images. The display unit 110 may be, for example, an organic light emitting display panel, a liquid crystal display panel, an electrophoretic display panel, or an inorganic light emitting display panel.

As shown in FIG. 1, the display unit 110 may include a lower substrate 111 and an upper substrate 112. The lower substrate 111 may be a thin film transistor substrate formed of plastic or glass. The upper substrate 112 may be a sealing substrate formed of a plastic film, a glass substrate, or a protective film.

The display unit 110 may include scan lines SL1 to SLn, data lines DL1 to DLm, a first power line PL1, a second power line PL2, and a plurality of pixels PXLs. Here, each of n and m is a positive integer. The scan lines SL1 to SLn, data lines DL1 to DLm, first power line PL1, second power line PL2 may at least partially extend in a non-display region of the display unit.

The pixels PXLs may be disposed or positioned in an area (for example, a pixel area) partitioned by the scan lines SL1 to SLn and the data lines DL1 to DLm. Each pixel PXL may be connected to one of the scan lines SL1 to SLn and one of the data lines DL1 to DLm. For example, a pixel PXLij positioned at an i-th row and a j-th column of the display unit 110 may be connected to an i-th scan line SLi and a j-th data line DLj. Here, each of i and j is a positive integer.

In addition, each pixel PXL may be electrically connected between the first power line PL1 and the second power line PL2. A first power voltage VDD may be applied to the first power line PL1, and a second power voltage VSS may be applied to the second power line PL2. The first and second power voltages VDD and VSS may be power voltages or driving voltages for operating the pixel PXLs. In one embodiment, the first power voltage VDD may have a voltage level higher than a voltage level of the second power voltage VSS. The first and second power voltages VDD and VSS may be provided to the display unit 110 from the power supply 150. The first power voltage VDD may be controlled (including drops in voltage) in a manner described in greater detail below.

The pixel PXLij may store (or record) a data signal (or a data voltage) provided through the j-th data line DLj in response to a scan signal provided through the i-th scan line SLi, and may emit light with a luminance corresponding to the stored data signal. The data signal (or data voltage) may be stored (or written) to a storage capacitor Cst as described in greater detail below.

The scan driver 120 may generate a scan signal (or scan signals) based on a scan control signal SCS output from the timing controller 140. The scan signal(s) may be sequentially provided from the timing controller 140 to the scan lines SL1 to SLn. In one embodiment, the scan control signal SCS may include a start signal, clock signals, and the like, which are provided from the timing controller 140 to the scan driver 120. For example, the scan driver 120 may be implemented as a shift register that sequentially generates and outputs a pulse type of scan signal by shifting a pulse type of start signal using the clock signals.

In one embodiment, the scan driver 120 may be formed together (integrally) with the pixels PXL of the display unit 110. However, the disclosure is not limited thereto, and for example, the scan driver 120 may be mounted on a circuit film and connected to the timing controller 140 via at least one circuit film and a printed circuit board.

In FIG. 2, the scan driver 120 is shown as being positioned on one side of the display unit 110, but the scan driver 120 is not limited thereto. For example, the scan driver 120 may be positioned on opposing sides (for example, left and right sides) of the display unit 110, or may be distributed and disposed in the display unit 110.

The data driver 130 generates data signals (or data voltages) based on image data DATA2 and a data control signal DCS provided from the timing controller 140. The data driver 130 provides the data signals to the display unit 110 (or the pixels PXL) through respective ones of the data lines DL1 to DLm. The data control signal DCS controls operation of the data driver 130, and may include a load signal (or a data enable signal), a horizontal start signal, a data clock signal, and the like instructing output of valid data signals. For example, the data driver 130 may include a shift register, a latch, a digital-to-analog converter, and a plurality of buffers (or amplifiers). The shift register may shift the horizontal start signal in synchronization with the data clock signal to generate a sampling signal. The latch may latch the image data DATA2 in response to the sampling signal. The digital-to-analog converter (or a decoder) may convert latched image data (for example, data of digital form) into data signals of analog form. The buffers (or amplifiers) output the data signals to the data lines DL1 to DLm.

As shown in FIG. 1, the data driver 130 may include a plurality of data driver integrated circuits (ICs) 131 (or source driver ICs). Each data driver IC 131 may be mounted on a flexible printed circuit board FPCB and may be connected to the timing controller 140 via at least one printed circuit board PCB1 or PCB2 and/or at least one cable CONN1 or CONN2.

The timing controller 140 may receive input image data DATA1 and a control signal CS from an external device (for example, a graphic processor of a host), and generate the scan control signal SCS and the data control signal DCS based on the control signal CS. In one embodiment, the control signal CS may include a vertical synchronization signal (or Vsync), a horizontal synchronization signal (or Hsync), a reference clock signal, and the like. The vertical synchronization signal may indicate a start of frame data (that is, data corresponding to a frame period in which one frame image is displayed), and the horizontal synchronization signal may indicate a start of line data (that is, one line data among a plurality of line data included in the frame data). In addition, the timing controller 140 may convert the input image data DATA1 to generate the image data DATA2. For example, the timing controller 140 may convert the input image data DATA1 of RGB format into the image data DATA2 of another predetermined (e.g., RGBG) format that corresponds, for example, to a pixel arrangement in the display unit 110. The data conversion may be performed based on an image data load and a scaling factor SF as described in greater detail below, e.g., see the discussion corresponding to FIG. 8.

For example, in embodiments, the timing controller 140 may calculate a load of the input image data DATA1. The timing controller 140 may then scale a first data value (for example, a grayscale value and a data bit) in the input image data DATA1 to generate a second data value based on the load to thereby generate the image data DATA2. For example, the timing controller 140 may determine a scaling constant (or a value of the scaling constant or scaling factor). The scaling constant may be determined so that a value obtained by multiplying the load by the scaling constant does not exceed a reference load value. The input image data DATA1 may be downscaled based on the scaling constant.

In this case, the size of the data signal supplied to each pixel PXL from the data driver 130 may be reduced, an amount of current flowing to each pixel PXL (and the display unit 110) may be reduced, and power consumption of the display device 100 may be reduced. That is, the timing controller 140 may reduce power consumption by performing a current limit operation. Embodiments of the current limit function of the timing controller 140 is described later with reference to FIG. 8. The timing controller 140 may perform a scaling operation on the input image data DATA1 before, after, or simultaneously with converting a format of the input image data DATA1.

The power supply 150 may supply the first power voltage VDD and the second power voltage VSS to the display unit 110. In addition, the power supply 150 may provide at least one of the scan driver 120, the data driver 130, or the timing controller 140 with a power voltage for driving the at least one of the scan driver 120, the data driver 130, or the timing controller 140. The power supply 150 may be implemented, for example, as a power management integrated circuit (PMIC).

In an embodiment, the power supply 150 may change a voltage level of input power applied to an input terminal to generate the first power voltage VDD and supply the first power voltage VDD to the display unit 110 through an output terminal. For example, the power supply 150 may generate the first power voltage VDD of 20 V DC to 24 V DC using 32 V DC. For example, the power supply 150 may include a DC-DC converter or a buck converter. A specific configuration of the power supply 150 that generates the first power voltage VDD is described later with reference to FIG. 4.

The power controller 160 may control operation of the power supply 150. In an embodiment, the power controller 160 may vary an allowable current of the power supply 150 based on a current (a total current, or a current amount) applied or flowing to the display unit 110 according to supply of the first power voltage VDD and the second power voltage VSS. For example, the power controller 160 may vary the allowable current of the power supply 150 by comparing the current with a reference current.

For example, the current may be measured or sensed through a current sensor at an output terminal of the power supply 150, e.g., the output terminal from which the first power voltage VDD is output. The current sensor may compare the current with the reference current (or a reference current value) and output an error signal (e.g., an overcurrent signal INF_OC) to the power controller 160 when the current is greater than the reference current. The overcurrent signal INF_OC may indicate that the measured current is greater than the reference current, or, for example, that an overcurrent or a rush current exists. In this case, in response to the overcurrent signal INF_OC, the power controller 160 may output a power control signal EN_P that varies the allowable current of the power supply 150 based on the overcurrent signal INF_OC.

In one example embodiment, the power supply 150 may include a plurality of converters (or power transistors) mutually connected in parallel at the output terminal of the power supply 150, and each of the converters may have the allowable current. The power controller 160 may vary the total allowable current of the converters (that is, the allowable current of the power supply 150) by turning one or more of the converters on/off or activating/deactivating one or more of the converters in response to the power control signal EN_P.

For example, the power controller 160 may reduce the allowable current of the power supply 150 when overcurrent occurs (that is, in response to the current exceeding the reference current). In this case, the current (or power) output from the power supply 150 becomes less than the current (or power) required by the display unit 110. As a result, a drop may occur in the first power voltage VDD, which, in turn, may cause a temporary reduction in luminance of the display panel. Although a temporary luminance reduction may occur due to the drop in the first power voltage VDD, power consumption may be reduced. For example, power consumption may be reduced by reducing the allowable current of the power supply 150 when the overcurrent occurs to drop the first power voltage VDD.

In an embodiment, the power controller 160 may additionally adjust the allowable current of the power supply 150 based on a change rate of the current when the overcurrent occurs, or a time point when the overcurrent occurs. For example, as a change amount of the current is reduced, or the time point when the overcurrent occurs is later, the power controller 160 may reduce the allowable current by an additional amount. An operation of reducing the allowable current based on the change amount of the current is described later with reference to FIGS. 16 and 17.

In an embodiment, the power controller 160 may vary the allowable current of the power supply 150 corresponding to the current limit operation of the timing controller 140. For example, when the timing controller 140 generates the image data DATA2 by downscaling the input image data DATA1 so that the current is limited to a specific current or less, the power controller 160 may vary the allowable current of the power supply 150 to correspond to the specific current. For example, the power controller 160 may turn off or deactivate one or more of the converters of the power supply 150 using the power control signal EN_P. In this case, power loss due to operation of the power supply 150 may be reduced.

At least a portion of the power controller 160 may be implemented as an integrated circuit (for example, an integrated circuit including one or more transistors, capacitors, encoders, registers, a multiplexer, and the like, or a field programmable gate array (FPGA)) or implemented as software in the integrated circuit. An example configuration and operation of the power controller 160 is described later with reference to FIGS. 13 and 14.

The power controller 160 may be implemented independently from the power supply 150 and the timing controller 140, as shown in FIG. 2, but is not limited thereto. For example, the power controller 160 may be included in the power supply 150 and/or the timing controller 140.

As described above, the display device 100 may reduce the allowable current of the power supply 150 when an overcurrent is detected or inrush current is supplied from the power supply 150 to the display unit 110. In this case, a power voltage (or the first power voltage VDD) may be dropped, and power consumption may be reduced despite the overcurrent.

In addition, the display device 100 may limit the current flowing to the display unit 110 by generating the image data DATA2 by downscaling the input image data DATA1, and may reduce the allowable current of the power supply 150 correspondingly to the limited current. Operation of the power supply 150 may be optimized for the limited current, and power loss due to an unnecessary operation of the power supply 150 may be reduced.

Meanwhile, at least one of the scan driver 120, the data driver 130, the timing controller 140, the power supply 150, or the power controller 160 may be formed in the display unit 110, or may be implemented as an integrated circuit and connected to the display unit 110, for example, in the form of a tape carrier package. In addition, at least two of the scan driver 120, the data driver 130, the timing controller 140, the power supply 150, or the power controller 160 may be implemented as one integrated circuit. For example, at least a portion of the circuits of the power controller 160 may be included in the timing controller 140.

Figure 3:
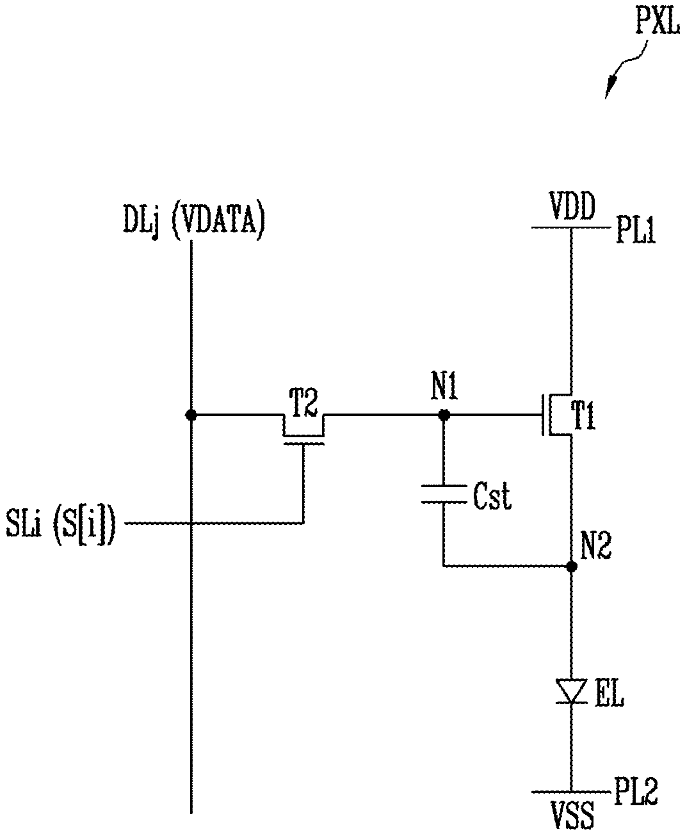
FIG. 3 is a circuit diagram illustrating an example of a pixel included in the display device of FIG. 2.

FIG. 3 is a circuit diagram illustrating an example of a pixel PXL which may be representative of the structure of the pixels included in the display device 100 of FIG. 2. The pixel PXL shown in FIG. 3 is positioned in an i-th row and a j-th column as an example.

Referring to FIG. 3, the pixel PXL may be connected to the i-th scan line SLi and the j-th data line DLj. The pixel PXL may include a light emitting element EL, a first transistor T1 (or a driving transistor), a second transistor T2 (or a first switching transistor), and a storage capacitor Cst. Each of the first transistor T1 and the second transistor T2 may be a thin film transistor including an oxide semiconductor, but is not limited thereto. For example, at least a portion of the first transistor T1 and the second transistor T2 may include a polysilicon semiconductor or may be implemented as an N-type semiconductor or a P-type semiconductor.

A first electrode (or an anode electrode) of the light emitting element EL may be connected to a second node N2 (or a second electrode of the first transistor T1). The first electrode of the light emitting element EL may be connected to the first power line PL1 via the first transistor T1. The first power voltage VDD (output from the power supply 150) may be applied to the first power line PL1. The first power voltage VDD may be varied (e.g., allowed to drop) as described herein to lower power consumption.

A second electrode (or a cathode electrode) of the light emitting element EL may be connected to the second power line PL2. The second power voltage VSS (output from power supply 150) may be applied to the second power line PL2.

The light emitting element EL may generate light of a predetermined luminance corresponding to the amount of current (or a driving current) supplied from the first transistor T1. For example, the light emitting element EL may be configured of an organic light emitting diode. However, the disclosure is not limited thereto. For example, the light emitting element EL may be configured of an inorganic light emitting diode such as a micro light emitting diode (LED) or a quantum dot light emitting diode, or may be a light emitting diode configured of a composite of an organic material and an inorganic material.

A first electrode (for example, a drain electrode) of the first transistor T1 may be connected to the first power line PL1, and the second electrode (for example, a source electrode) of the first transistor T1 may be connected to the second node N2 (or the anode electrode of the light emitting element EL). A gate electrode of the first transistor T1 may be connected to a first node N1 (or a second electrode of the second transistor T2). The first transistor T1 may control the amount of current flowing to the light emitting element EL corresponding to a voltage of the first node N1 (or a gate-source voltage between the gate electrode and the second electrode of the first transistor T1).

A first electrode of the second transistor T2 may be connected to the j-th data line DLj, and the second electrode of the second transistor T2 may be connected to the first node N1 (or the gate electrode of the first transistor T1). A gate electrode of the second transistor T2 may be connected to the i-th scan line SLi. When an i-th scan signal S[i] is supplied to the i-th scan line SLi, the second transistor T2 may be turned on to transmit a data signal VDATA (or a data voltage) from the j-th data line DLj to the first node N1.

The storage capacitor Cst may be formed or connected between the first node N1 and the first electrode of the light emitting element EL. The storage capacitor Cst may store the voltage of the first node N1, whose voltage is controlled based on the data signal VDATA.

For example, when the second transistor T2 is turned on in response to the i-th scan signal S[i], a voltage corresponding to the data signal VDATA may be stored in the storage capacitor Cst, and the first transistor T1 may control the amount of current flowing to the light emitting element EL based on the voltage stored in the storage capacitor Cst.

The pixels PXL of the display unit 110 are not limited to a circuit structure shown in FIG. 2. For example, each pixel PXL of the display unit 110 may further include a sensing transistor that initializes the second node N2 or outputs information on a characteristic (for example, a threshold voltage of the first transistor T1) of the pixel PXL to an external circuit through the second node N2.

As another example, the pixel PXL may further include other circuit elements such as a compensation transistor for compensating for the threshold voltage or the like of the first transistor T1, an initialization transistor for initializing the first node N1 and/or the second node N2, at least one emission control transistor for controlling a period in which the driving current is supplied to the light emitting element EL, a boosting capacitor for boosting the voltage of the first node N1, and/or the like.

Figure 4:
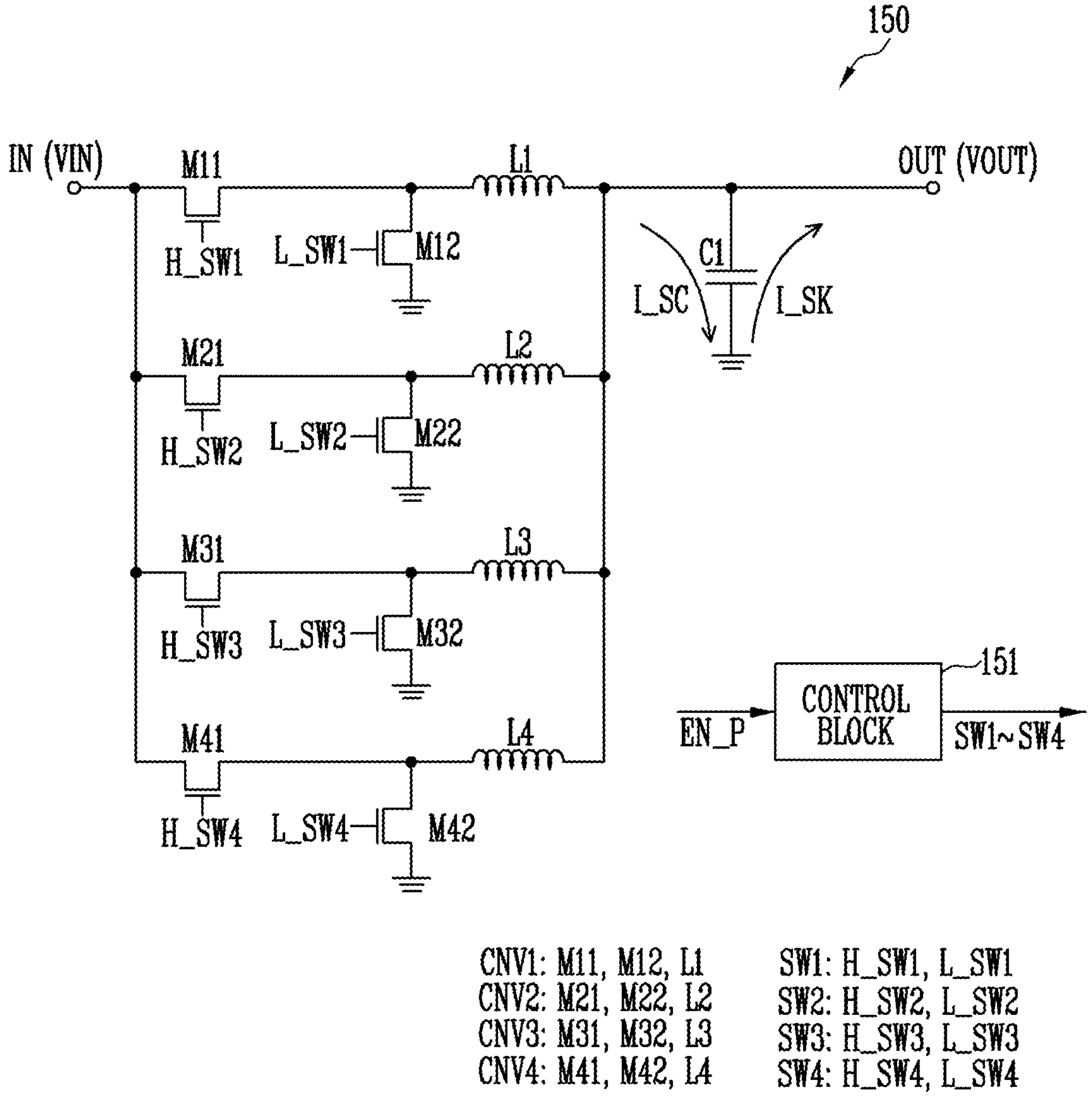
FIG. 4 is a diagram illustrating an embodiment of a power supply included in the display device of FIG. 2.
Figures 5, 6:
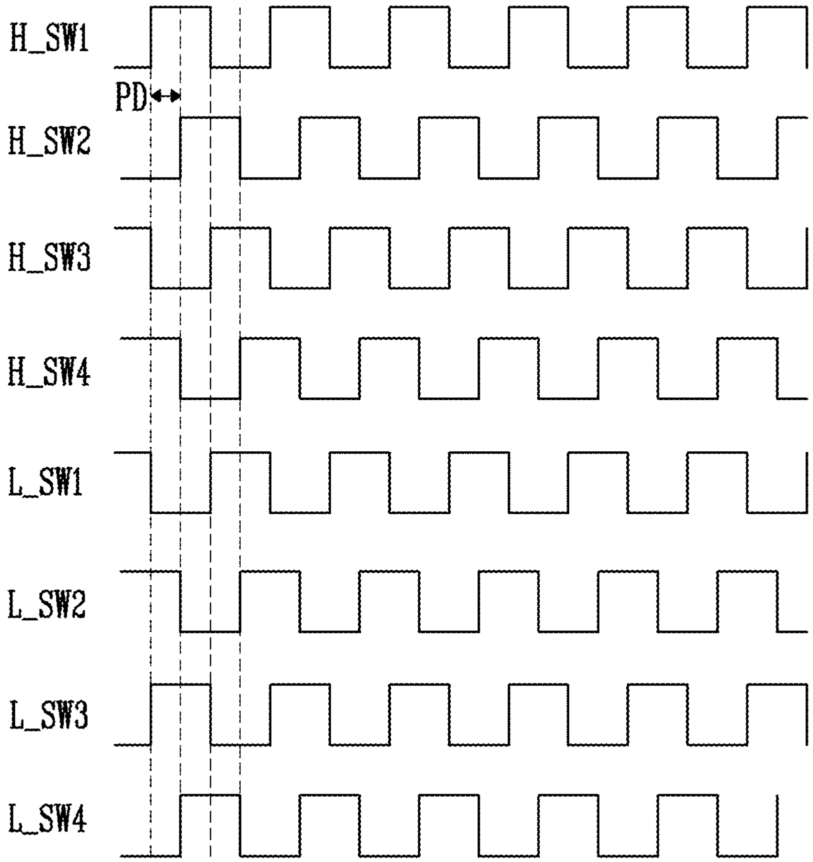
FIG. 5 is a waveform diagram illustrating an embodiment of a switching control signal measured in the power supply of FIG. 4.
FIG. 6 is a diagram illustrating an operation and a current characteristic of the power supply of FIG. 4 according to an embodiment.
Figure 7:
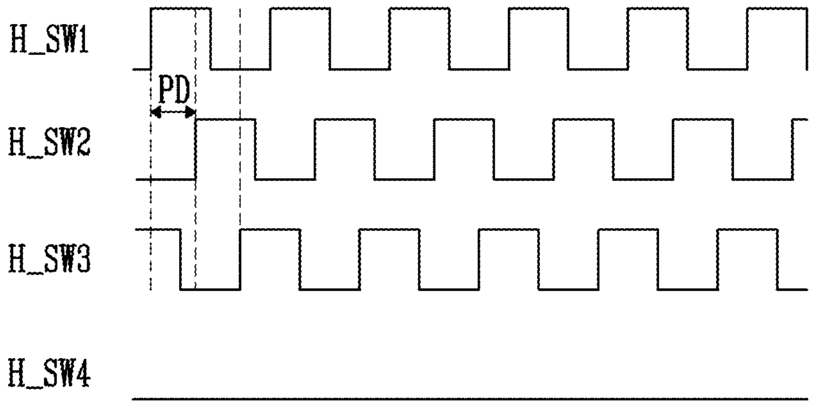
FIG. 7 is a waveform diagram illustrating an embodiment of the switching control signal measured in the power supply of FIG. 4.

FIG. 4 is a drawing illustrating an embodiment of the power supply 150 included in the display device 100 of FIG. 2. FIG. 4 schematically shows the power supply 150 based on a configuration which outputs the first power voltage VDD (refer to FIG. 2). FIG. 5 is a waveform diagram illustrating an embodiment of a switching control signal SCS measured in the power supply of FIG. 4. FIG. 6 is a diagram illustrating operation and a current characteristic of the power supply of FIG. 4. FIG. 7 is a waveform diagram illustrating another embodiment of the switching control signal SCS measured in the power supply of FIG. 4.

Referring to FIG. 4, the power supply 150 may receive an input voltage VIN (or a first voltage) through an input terminal and output an output voltage VOUT (or a second voltage) supplied to the display unit 110 to an output terminal. The output voltage may be, for example, first power voltage VDD. For example, the power supply 150 may change a voltage level of the input voltage VIN (or input power) applied to the input terminal IN and output the output voltage VOUT through the output terminal OUT. The output voltage VOUT may be the first power voltage VDD (refer to FIG. 2). For example, the input voltage VIN may be 32 V DC, and the output voltage VOUT may be 20 V DC to 24 V DC, but one or more of these voltages may be different in other embodiments.

The power supply 150 may include one or more converters. For example, the power supply 150 may include four converters CNV1 to CNV4 connected in parallel and arranged to be selectively activated, but the number and/or arrangement of converters may be different in other embodiments.

For example, the power supply 150 may include an eleventh transistor M11, a twelfth transistor M12, a first inductor L1, a first capacitor C1, and a control block 151. The eleventh transistor M11, the twelfth transistor M12, and the first inductor L1 may configure one converter, or a first converter CNV1.

The eleventh transistor M11 and the first inductor L1 may be connected between the input terminal IN and the output terminal OUT in series. The twelfth transistor M12 may be connected between an intermediate node between the eleventh transistor M11 and the first inductor L1, and reference power (for example, ground). The first capacitor C1 may be commonly connected to the outputs of the converter circuits, and as shown in FIG. 4 may be connected between the output terminal OUT and the reference power.

In operation, the eleventh transistor M11 may be turned on in response to a 1a-th switching control signal H_SW1, and the twelfth transistor M12 may be turned on in response to a 1b-th switching control signal L_SW1. The 1a-th switching control signal H_SW1 and the 1b-th switching control signal L_SW1 may have alternating on-levels, as shown, for example, in FIG. 5. A first switching control signal SW1 including the 1a-th switching control signal H_SW1 and the 1b-th switching control signal L_SW1 may be provided from the control block 151. The eleventh transistor M11 and the twelfth transistor M12 may be alternately turned on (or toggled) in response to the first switching control signal SW1, e.g., based on the alternating on-levels of the 1a-th switching control signal H_SW1 and the 1b-th switching control signal L_SW1. To this end, the 1b-th switching control signal L_SW1 may have a phase difference of 180 degrees or may have an inverted waveform from the 1a-th switching control signal H_SW1.

In an embodiment, the converters (or converting circuits) of the power supply 150 may be mutually connected between the input terminal IN and the output terminal OUT in parallel. As shown in FIG. 4, each of the converters may include at least one transistor and at least one inductor. As a required luminance of the display device 100 increases, the display device 100 may require a high current characteristic. Thus, the power supply 150 may include the plurality of converters to regulate the current to be output from the output terminal OUT.

For example, the power supply 150 may include first to fourth converters CNV1 to CNV4, but may include a different plurality of converters in another embodiment. In a four-converter configuration, the power supply 150 may include the second converter CNV2, the third converter CNV3, and the fourth converter CNV4 in addition to the first converter CNV1.

A twenty-first transistor M21, a twenty-second transistor M22, and a second inductor L2 may configure the second converter CNV2.

A thirty-first transistor M31, a thirty-second transistor M32, and a third inductor L3 may configure the third converter CNV3.

A forty-first transistor M41, a forty-second transistor M42, and a fourth inductor L4 may configure the fourth converter CNV4.

An internal configuration (that is, a connection configuration of the transistors and the inductor) of each of the second to fourth converters CNV2 to CNV4 may be substantially equal or similar to an internal configuration of the first converter CNV1 as shown in FIG. 4. Thus, a description of the internal configuration of each of the second to fourth converters CNV2 to CNV4 is omitted. Each of the transistors M11 to M42 may be implemented as a MOSFET (e.g., n-type MOSFETs), but each of the transistors M11 to M42 may be implemented as p-type MOSFETs in other embodiments. Additionally, each of the first to fourth inductors L1 to L4 may have the same inductance. In another embodiment, the first to fourth inductors L1 to L4 may have difference inductances in order to meet the requirements of the output current of the power supply 150.

In an embodiment, first to fourth switching control signals SW1 to SW4 may have the same waveform but different phases. For example, the first to fourth switching control signals SW1 to SW4 may have a phase difference PD of 90 degrees.

Referring to FIG. 5, for example, 1a-th to 4a-th switching control signals H_SW1 to H_SW4 may be a square wave or pulse that alternate between a high (or on) level and a low (or off) level. The 2a-th switching control signal H_SW2 provided to the twenty-first transistor M21 may have a phase delayed by 90 degrees compared to the 1a-th switching control signal H_SW1. The 3a-th switching control signal H_SW3 provided to the thirty-first transistor M31 may have a phase delayed by 90 degrees compared to the 2a-th switching control signal H_SW2. The 4a-th switching control signal H_SW4 provided to the forty-first transistor M41 may have a phase delayed by 90 degrees compared to the 3a-th switching control signal H_SW3. These phase shifts are evident from the dotted lines in FIG. 5.

When the 1b-th to 4b-th switching control signals L_SW1 to L_SW4 have an on-level (e.g., when converters are to be deactivated), transistors M12, M22, M32, and M42 are turned on. As a result, current in associated ones of the inductors L1 to L4 may be dissipated to ground, as shown in FIG. 4.

Meanwhile, a 2b-th switching control signal L_SW2 provided to a twenty-second transistor M22, a 3b-th switching control signal L_SW3 provided to a thirty-second transistor M32, and a 4b-th switching control signal L_SW4 provided to a forty-second transistor M42 may have phase differences of 180 degrees compared to the 2a-th switching control signal H_SW2, the 3a-th switching control signal H_SW3, and the 4a-th switching control signal H_SW4, respectively, and 1b-th to 4b-th switching control signals L_SW1 to L_SW4 may have phases that are sequentially delayed by 90 degrees.

When the firth to fourth switching control signals SW1 to SW4 have different phases, the presence of a ripple of the output voltage VOUT may be reduced or prevented, and power stability (or power supply stability) may be improved. Meanwhile, a structure operating k (where k is a positive integer) buck converters (or converters) by shifting the phase of the switching control signal (for example, the first to fourth switching control signals SW1 to SW4) may be referred to as a k-phase interleaved buck converter.

Referring again to FIG. 4, the control block 151 (which may be included in power supply 150) may control operation of the first to fourth converters CNV1 to CNV4 using the first to fourth switching control signals SW1 to SW4. In an embodiment, the control block 151 may vary the allowable current of the power supply 150 (the current I_SK output through the output terminal OUT) by activating (or operating) one or more of the first to fourth converters CNV1 to CNV4, or by adjusting the number of activated converters, based on the power control signal EN_P output from the power controller 160. As described in greater detail below, the current I_SK may be a sinking current in one embodiment.

FIG. 6 is a table showing example cases of the on/off states of the switches SW1 to SW4 in generating the allowable current of the power supply 150. Referring to FIG. 6, for example, in a first case CASE1, all of the first to fourth switching control signals SW1 to SW4 may be turned on or toggled. In this case, all of the first to fourth converters CNV1 to CNV4 may be activated by the first to fourth switching control signals SW1 to SW4, and the allowable current of the power supply 150 may be equal to the total allowable current of the first to fourth converters CNV1 to CNV4, e.g., a sum of the current output from the first to fourth converters CNV1 to CNV4. For example, when a maximum current that each of the first to fourth converters CNV1 to CNV4 may supply (that is, the allowable current of each of the first to fourth converters CNV1 to CNV4) is X (for example, 8 A), the allowable current of the power supply 150 according to the first case CASE1 may be 4× (for example, 4×8 A=32 A). Since four converters are activated, operation of the power supply 150 according to the first case CASE1 may be referred to as a 4-phase operation.

In a second case CASE2, only the first to third switching control signals SW1 to SW3 may be turned on, and the fourth switching control signal SW4 may be turned off. For example, as shown in FIG. 7, the 1a-th to 3a-th switching control signals H_SW1 to H_SW3 may have a square wave (or pulse), and the 4a-th switching control signal H_SW4 may be maintained at an off-level, e.g., a low level for NMOS logic. In this case, the first to third converters CNV1 to CNV3 may be activated, the fourth converter CNV4 may be deactivated, the allowable current of the power supply 150 may be equal to the total allowable current of the first to third converters CNV1 to CNV3. For example, the allowable current of the power supply 150 according to the second case CASE2 may be 3× (for example, 3×8 A=24 A). Since three converters are activated, operation of the power supply 150 according to the second case CASE2 may be referred to as a three-phase operation.

In a third case CASE3, only the first and second switching control signals SW1 and SW2 may be turned on or toggled so that the first and second converters CNV1 and CNV2 may be activated, and the third and fourth switching control signals SW3 and SW4 may be turned off so that the third and fourth converters CNV3 and CNV4 may be deactivated. For example, the 1a-th and 2a-th switching control signals H_SW1 to H_SW2 may have a square wave (or pulse), and the 3a-th switching control signal H_SW3 and the 4a-th switching control signal H_SW4 may be maintained at an off-level, e.g., a low level for NMOS logic. In this case, the allowable current of the power supply 150 may be equal to the total allowable current of the first and second converters CNV1 and CNV2, and for example, the allowable current of the power supply 150 according to the third case CASE3 may be 2× (for example, 2×8 A=16 A). Since two converters are activated, operation of the power supply 150 according to the third case CASE3 may be referred to as a two-phase operation.

In a fourth case CASE4, only the first switching control signal SW1 may be turned on or toggled so that only the first converter CNV1 may be activated, and the second to fourth switching control signals SW2 to SW4 may be turned off so that the second to fourth converters CNV2 to CNV4 may be deactivated. That is, the 1a-th switching control signal H_SW1 may have a square wave (or pulse), and the 2a-th to 4a-th switching control signals H_SW2, H_SW3, and H_SW4 may be maintained at an off-level, e.g., a low level for NMOS logic. In this case, the allowable current of the power supply 150 may be equal to the total allowable current of the first converter CNV1, and for example, the allowable current of the power supply 150 according to the fourth case CASE4 may be X (for example, 1×8 A=8 A). Since one converter is activated, operation of the power supply 150 according to the first case CASE4 may be referred to as a 1-phase operation.

Although it has been described that the allowable currents of each of the first to fourth converters CNV1 to CNV4 are the same X (for example, 8 A), the disclosure is not limited thereto. For example, the allowable currents of the first to fourth converters CNV1 to CNV4 may be different from each other. These differences may be achieved, for example, by varying the inductances of one or more of the inductors L1 to L4. In this case, by selectively activating the first to fourth converters CNV1 to CNV4, the allowable current (e.g., output current through output terminal OUT) of the power supply 150 may be changed to, for example, achieve lower power consumption of the display device in an overcurrent situation to meet the requirements of a data conversion operation as described herein.

In an embodiment, when the allowable current of the power supply 150 is reduced (e.g., when the power supply 150 operates while reducing a phase to deactivate one or more corresponding converters CNV), the phase difference PD among the power control signals may change depending on the number of activated converters. Referring to FIG. 5, for example, when the power supply 150 operates in 4-phase operation according to the first case CASE1, the phase difference PD may be 90 degrees (that is, 360 degrees/4). Referring to FIG. 7, for example, when the power supply 150 operates in 3-phase operation according to the second case CASE2, the phase difference PD may be 120 degrees (that is, 360 degrees/3). In this case, any ripple in the output voltage VOUT may be uniformly reduced. For example, when the power supply 150 operates in 2-phase operation according to the third case CASE3, the phase difference PD may be 180 degrees (that is, 360 degrees/2).

For reference, the transistors M11 to M42 may have a turn-on resistance. As a result, power loss may occur when the transistors M11 to M42 are turned on. In addition, the inductors L1 to L4 have an internal winding resistance. As a result, additional power loss may occur due to the presence of the inductors L1 to L4. As the current requirements of the display unit 110 increases, the power supply 150 may activate more of the converter stages of the power supply 150 (that is, the transistors M11 to M42 and the inductors L1 to L4) to supply higher current. However, a very large power loss may occur as a result. Therefore, the operational phase of the power supply 150 may be varied among the first to fourth cases CASE1 to CASE4 based on the required current of the display unit 110, in order to achieve a substantial reduction in power loss.

Meanwhile, the power supply 150 is described as including four converters in FIG. 4, but is not limited thereto. For example, the power supply 150 may include two, three, five or more converters.

Figure 8:
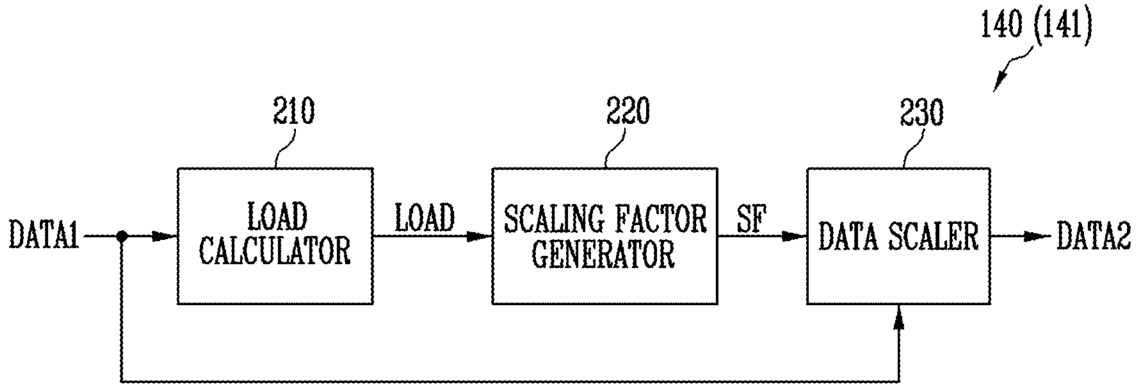
FIG. 8 is a block diagram illustrating an embodiment of a timing controller included in the display device of FIG. 2.

FIG. 8 is a block diagram illustrating an embodiment of the timing controller 140 included in the display device of FIG. 2. FIG. 8 schematically shows the timing controller 140 performing the current limit function (or net power control (NPC)). The current limit function may be implemented as a power consumption adjustment block 141 configured as a logic circuit in the timing controller 140. The logic circuit may be implemented in hardware, software, or a combination thereof.

Figure 9:
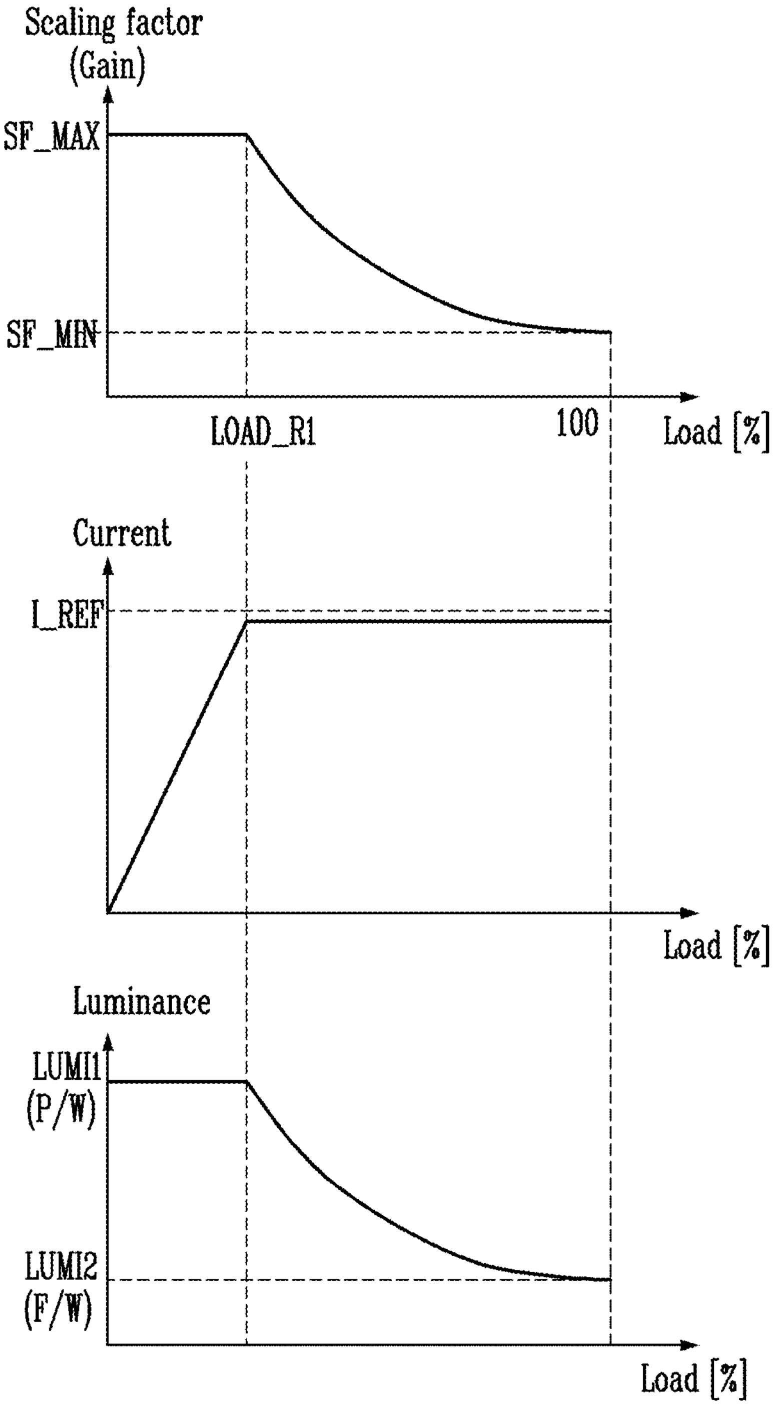
FIG. 9 is a diagram illustrating an embodiment of a scaling factor, a current, and a luminance according to a load of input image data.
Figure 10:
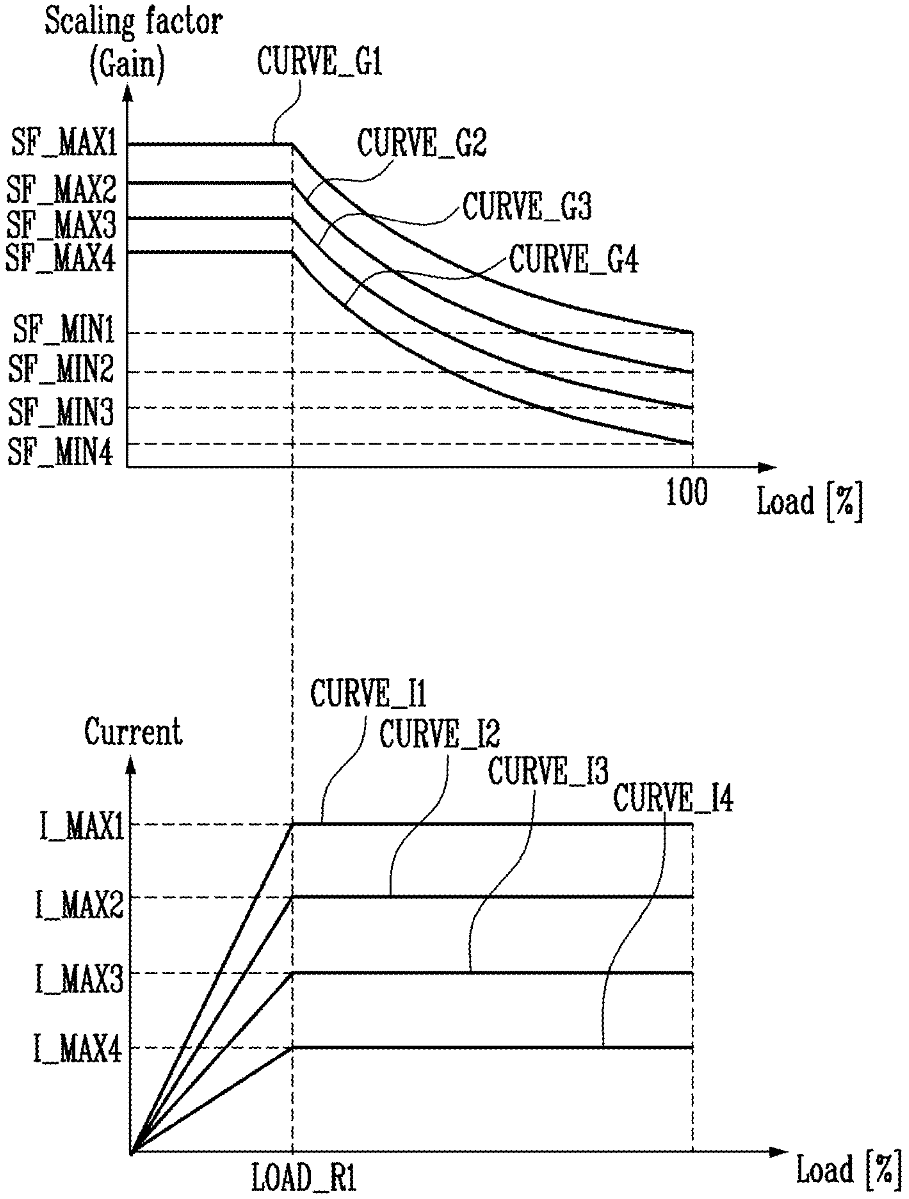
FIG. 10 is a diagram illustrating an embodiment of a scaling factor and a current for each of a plurality of modes.

FIG. 9 is a diagram illustrating a scaling factor, a current, and a luminance plotted versus a load of input image data. The current may be a total current flowing in the display unit 110, and the luminance may be a luminance of a white image. FIG. 10 is a diagram illustrating a scaling factor and a current for each of a plurality of operational modes.

Referring to FIG. 8, the timing controller 140 may include a load calculation block (load calculator) 210, a scaling factor generation block (scaling factor generator) 220, and a data scaling block (data scaler) 230. Each of the load calculation block 210, the scaling factor generation block 220, and the data scaling block 230 may be implemented as a combination of logical operation elements (or logical elements). The logical elements may be implemented as hardware, software, or both, in the timing controller 140.

The load calculation block (load calculator or load logic) 210 may calculate or determine a load LOAD associated with the input image data DATA1. The load LOAD may represent a ratio of the pixel PXL (or pixels) that emit light relative to the total number of pixels in the display unit 110. In one embodiment, the load may represent a ratio of the pixels that emit light of a predetermined luminance in the display unit 110. For example, when the display unit 110 emits light in full white (for example, when all pixels in the display unit 110 emit light with a luminance corresponding to white), the load LOAD may be set to 100%. The load calculation block 210 may calculate the load LOAD of the input image data DATA1 (or a load of the display unit 110 according to the input image data DATA1) in a frame unit. For example, the load calculation block 210 may calculate the load LOAD for one frame data (or one frame) in a method of calculating a sum of data values included in the one frame data of the input image data DATA1.

The scaling factor generation block (scaling factor generator or scaling factor generation logic) 220 may generate or set a scaling factor SF (or gain) based on the load LOAD. The scaling factor may be used to adjust the data values (for example, a first data value corresponding to a pixel PXL) in the input image data DATA1 in consideration of the load LOAD. For example, the scaling factor generation block 220 may determine the scaling factor SF so that a value obtained by multiplying the load LOAD by a luminance according to the load LOAD is maintained to be less than or equal to a specific value.

In an embodiment, the scaling factor generation block 220 may generate the scaling factor SF based on Equation 1.

$$SF = \text{NPC\_Limit} \times \left(\frac{1}{\text{LOAD}}\right)^P \quad (1)$$

where NPC_limit is a maximum load (for example, a reference load LOAD_R1 in FIG. 9) that may emit light with a first luminance LUMI1 (or a peak white (P/W) luminance), and may be set to a value greater than 0 and less than or equal to 1. The parameter P may be a control value (or data) that controls a downward slope from the first luminance LUMI1 to a second luminance LUMI2 (or a full white (F/W) luminance) of the display device 100. Depending on the determined load of the input image data, the scaling factor SF may be set to be greater than or less than 1.

As shown in FIG. 9, when the load LOAD is less than or equal to the reference load LOAD_R1, the scaling factor SF may have a maximum value SF_MAX. However, when the load exceeds the reference load LOAD_R1, the scaling factor SF may be lowered in a manner proportional to the curve shown in FIG. 9. When the load LOAD is at a maximum value (e.g., 100%), the scaling factor SF is lowered down to a minimum value SF_MIN.

The data scaling block 230 may convert the input image data DATA1 into the image data DATA2 using the scaling factor SF. For example, the data scaling block 230 may generate the image data DATA2 (for example, a second data value included in the image data DATA2 and corresponding to the pixel PXL) by multiplying data values included in the input image data DATA1 (for example, the first data value corresponding to the pixel PXL) by the scaling factor SF. As the scaling factor SF is reduced, the data value of the image data DATA2 may be reduced. This may reduce the size of the data signal generated by the data driver 130, which, in turn, may reduce the amount of current flowing to each pixel PXL. As a result, the beneficial effect may be achieved of lowering power consumption of the display unit 110 when the load LOAD exceeds the reference load LOAD_R1.

For example, referring to FIG. 9, when the load LOAD is less than or equal to the reference load LOAD_R1, the current (or a total current) may vary in a range less than or equal to the reference current I_REF (or a reference current value) in proportion to the load LOAD. Also, the first luminance LUMI1 (or the peak white luminance) may be maintained constant corresponding to the maximum value SF_MAX.

When the load LOAD is greater than the reference load LOAD_R1, the current may be maintained at a substantially constant value regardless of the size of the load LOAD. Since the scaling factor SF is set to be inversely proportional to the load LOAD according to Equation 1, the load of the image data DATA2 to which the scaling factor SF is reflected (for example, a value obtained by multiplying the scaling factor SF by the load LOAD of the input image data DATA1) may be maintained constant. Thus, the current may be maintained as a constant value that is substantially equal to a reference current I_REF. In other words, the scaling factor SF may be set so that the current does not exceed the reference current I_REF.

As the load LOAD continues to increase above the reference load LOAD_R1, the luminance may be lowered from the first luminance LUMI1 to the second luminance LUMI2 (or the full white luminance) corresponding to the minimum value SF_MIN.

As described above and with reference to FIG. 9, according to operation of the timing controller 140 (or the power consumption adjustment block 141), the current flowing in the pixels of the display unit 110 may be limited to be less than or equal to the reference current I_REF. As a result, power consumption of the display device 100 may be reduced when the load reaches elevated levels above the reference load.

In an embodiment, the timing controller 140 may limit the current flowing in the display unit 110 according to a plurality of modes. For example, an electronic device (or host) 1000 (e.g., refer to FIG. 18) including the display device 100 may have various image quality setting modes. For example, the image quality setting modes may include a normal mode, a minimum power saving (for example, a game mode), a maximum power saving (for example, a reading mode), and the like. The image quality setting modes may include, for example, luminance setting values such as 75%, 100%, and 60%. The display device 100 may include the plurality of modes which may have different current limits corresponding to the image quality setting modes.

Referring to FIG. 10, for example, the timing controller 140 may operate according to four modes of the electronic device 1000 having different gain curves and different current curves. For example, a first gain curve CURVE_G1 represents a scaling factor in a first mode, and a first current curve CURVE_I1 represents a total current flowing in the display unit 110 in the first mode. The scaling factor according to the first gain curve CURVE_G1 may have a first maximum value SF_MAX1 (for example, 1) when the load LOAD is less than the reference load LOAD_R1, and may have values between the first maximum value SF_MAX1 and the first minimum value SF_MIN1, (for example, 0.4) when the load LOAD exceeds the reference load LOAD_R1. In addition, the current may be limited to be less than or equal to a first maximum current I_MAX1 (for example, 32 A). For example, the current may be linearly proportional to the load LOAD when the load LOAD is less than the reference load LOAD_R1, and set to the first maximum current I_MAX2 when the load LOAD is greater than or equal to the reference load LOAD_R1.

A second gain curve CURVE_G2 represents a scaling factor in a second mode, and a second current curve CURVE_I2 represents the total current flowing in the display unit 110 in the second mode of the electronic device 1000. The scaling factor according to the second gain curve CURVE_G2 may have a second maximum value SF_MAX2 (for example, 0.9) when the load LOAD is less than the reference load LOAD_R1, and values between the second maximum value SF_MAX2 to a second minimum value SF_MIN2 (for example, 0.3) when the load LOAD is greater than the reference load LOAD_R1. Additionally, the current may be limited to be less than or equal to a second maximum current I_MAX2 (for example, 24 A) throughout the range of loads LOAD.

A third gain curve CURVE_G3 represents a scaling factor in a third mode, and a third current curve CURVE_I3 represents the total current flowing in the display unit 110 in the third mode of the electronic device 1000. The scaling factor according to the third gain curve CURVE_G3 may have a third maximum value SF_MAX3 (for example, 0.8) when the load is less than the reference load LOAD_R1, and values between the third maximum value SF_MAX3 and a third minimum value SF_MIN3 (for example, 0.2) when the load exceeds the reference load LOAD_R1. Additionally, the current may be limited to be less than or equal to a third maximum current I_MAX3 (for example, 16 A) throughout the range of loads.

A fourth gain curve CURVE_G4 represents a scaling factor in a fourth mode, and the fourth current curve CURVE_I4 represents the total current flowing in the display unit 110 in the fourth mode of the electronic device. The scaling factor according to the fourth gain curve CURVE_G4 may have a fourth maximum value SF_MAX4 (for example, 0.7) when the load LOAD is less than the reference load LOAD_R1, and may have values between the fourth maximum value SF_MAX4 and a fourth minimum value SF_MIN4 (for example, 0.1) when the load LOAD is greater than the reference load LOAD_R1. Additionally, the current may be limited to be less than or equal to a fourth maximum current I_MAX4 (for example, 8 A) throughout the range of loads.

A maximum current (e.g., a reference current that becomes a reference of current limitation) may be different for each mode of the electronic device 1000. Therefore, the power controller 160 (e.g., refer to FIG. 1) may vary the allowable current of the power supply 150 in consideration of the reference current for each mode. Accordingly, power loss of the power supply 150 may be reduced. Examples of methods for varying the allowable current of the power supply 150 for each mode is described later with reference to FIG. 15.

Figure 11:
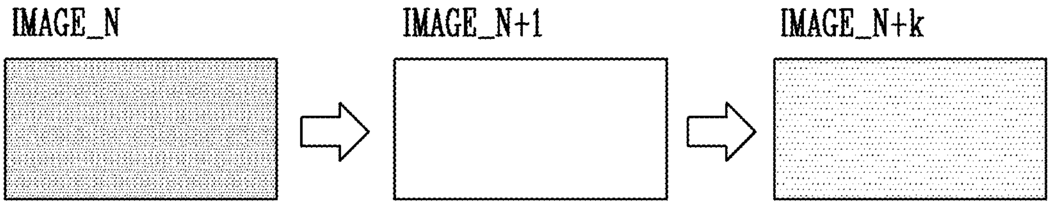
FIG. 11 is a diagram illustrating an example of an image displayed on the display device of FIG. 2.
Figure 12:
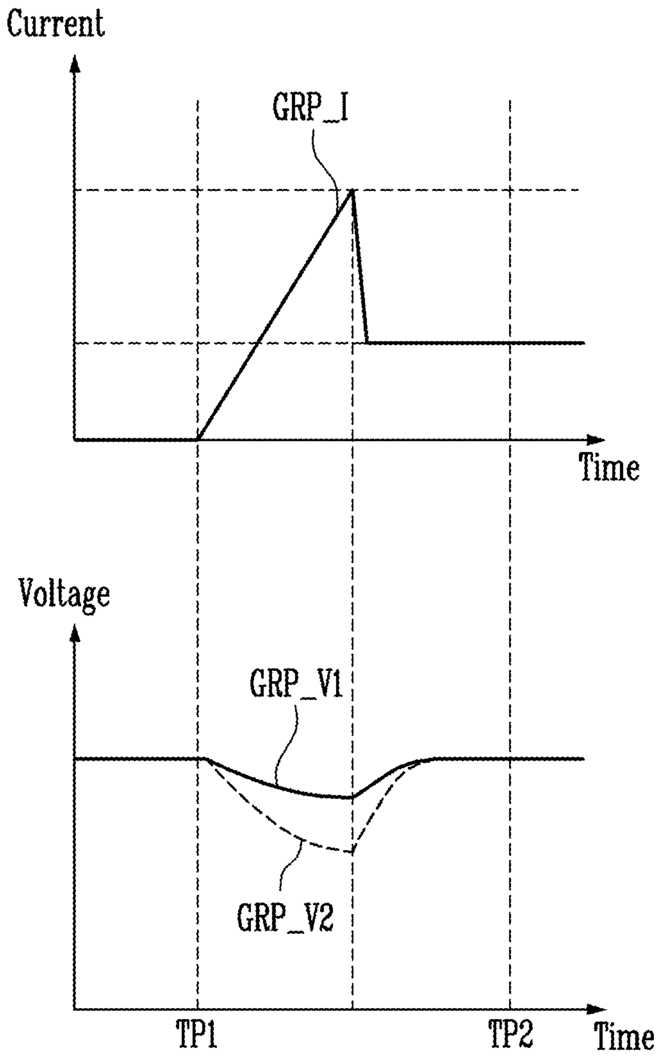
FIG. 12 is a diagram illustrating a current and a voltage according to an image of FIG. 10 according to an embodiment.

FIG. 11 is a drawing illustrating an example of an image displayed on the display device 100 of FIG. 2. FIG. 12 is a drawing illustrating examples of a current and a voltage according to the image of FIG. 10. Hereinafter, the disclosure is described based on a case where the display device 100 displays a full black image (or a full black pattern) and then displays a full white image (or a full white pattern).

Referring to FIGS. 8, 9, 11, and 12, in an N-th (where N is a positive integer) frame, all data values of N-th frame data may be minimum values (for example, 0 which is a minimum value among values in a predetermined range, e.g., from 0 to 255) corresponding to an N-th frame image IMAGE_N which is the full black image. In this case, the load calculated in the load calculation block 210 may be substantially 0, the scaling factor (or the gain) calculated in the scaling factor generation block 220 may be the maximum value SF_MAX, and, when the reference load LOAD_R1 is greater than 0%, the current flowing in the display unit 110 may be substantially zero.

Thereafter, in an (N+1)-th frame (or at a first time point), (N+1)-th frame data in which all data values are maximum values (for example, 255) may be provided for the full white image. In this case, the load calculated in the load calculation block 210 may be substantially 100%, and the scaling factor calculated in the scaling factor generation block 220 may be the minimum value SF_MIN. However, when the entire (N+1)-th frame data is used in calculating the load, the scaling factor may not be updated while calculating the load and the scaling factor, and the data scaling block 230 may generate the image data DATA2 using a scaling factor calculated in a previous frame (for example, the maximum value SF_MAX calculated in the N-th frame). In this case, the current limit function of the timing controller 140 may not be applied, and an (N+1)-th frame image IMAGE_N+1 displayed on the display unit 110 may be the full white image without a luminance reduction (that is, a luminance reduction due to the current limit). As a result, an increase in power consumption may occur.

Thereafter, in an (N+k)-th frame or (at a second time point), (N+k)-th frame data in which all data values are the maximum values (for example, 255) may be provided for the full white image. The data scaling block 230 may generate the image data DATA2 using a scaling factor calculated in a previous frame (for example, the minimum value SF_MIN calculated in the (N+1)-th frame). In this case, the current limit function of the timing controller 140 may be properly applied to limit the current to a predetermined maximum value (e.g., see FIG. 10), and an (N+k)-th frame image IMAGE_N+k displayed on the display unit 110 may be an image in which a luminance is reduced instead of displaying the full white image, thereby resulting in a reduction in power consumption.

Thus, in this embodiment, due to calculation of the load and the scaling factor, the current limit function (or the scaling factor) of the timing controller 140 may be applied with a delay of at least one frame, and power consumption may be increased during at least one frame in which the current limit function is not properly applied.

Referring to FIG. 12, a current graph GRP_I and a first voltage graph GRP_V1 are shown. The current graph GRP_I represents a current (or a total current) supplied from the power supply 150 to the display unit 110. The first voltage graph GRP_V1 represents the first power voltage VDD applied to the display unit 110 (e.g., FIG. 2). The N-th frame and the (N+1)-th frame may be distinguished based on a first time point TP1, and the (N+1)-th frame and the (N+k)-th frame may be distinguished based on a second time point TP2.

The current may be substantially 0 in the N-th frame where a black image is displayed. After the first time point TP1, the current may increase (e.g., linearly increase) as the full white image is displayed in the (N+1)-th frame. After the second time point TP2, the current may be reduced to a specific predetermined value (a current limit value) as an image in which a luminance is reduced is displayed in the (N+k)-th frame.

For reference, when the current increases in the (N+1)-th frame, and especially when a sourcing current I_SC (e.g., refer to FIG. 4) is less than a sinking current I_SK (e.g., refer to FIG. 4), a voltage drop may occur as shown by the dotted line in the first voltage graph GRP_V1. The sourcing current I_SC may be a current (or a current amount) supplied based on the power supply 150, and the sinking current I_SK may be a current received or requested based on the display unit 110. As a difference between the sourcing current I_SC and the sinking current I_SK increases, the voltage drop may increase greatly, as shown by the second voltage graph GRP_V2. When the sourcing current I_SC is equal to or greater than the sinking current I_SK, as in the N-th frame and the (N+1)-th frame, the voltage drop does not occur.

As described above, the current limit function of the timing controller 140 (or the power consumption adjustment block 141) is performed with at least one frame (or a time corresponding thereto) delay. During a dead-zone period of the current limit function (e.g., a period between the first time point TP1 at which the current limit function is to be applied and the second time point TP2 at which the current limit function is actually applied), an overcurrent may flow into the display unit 110 and power consumption may increase. Therefore, the display device 100 according to embodiments may reduce the sourcing current I_SC or (a sourcing capability of the power supply 150) to additionally generate the voltage drop, thereby reducing power consumption in the dead-zone period of the current limit function.

Figure 13:
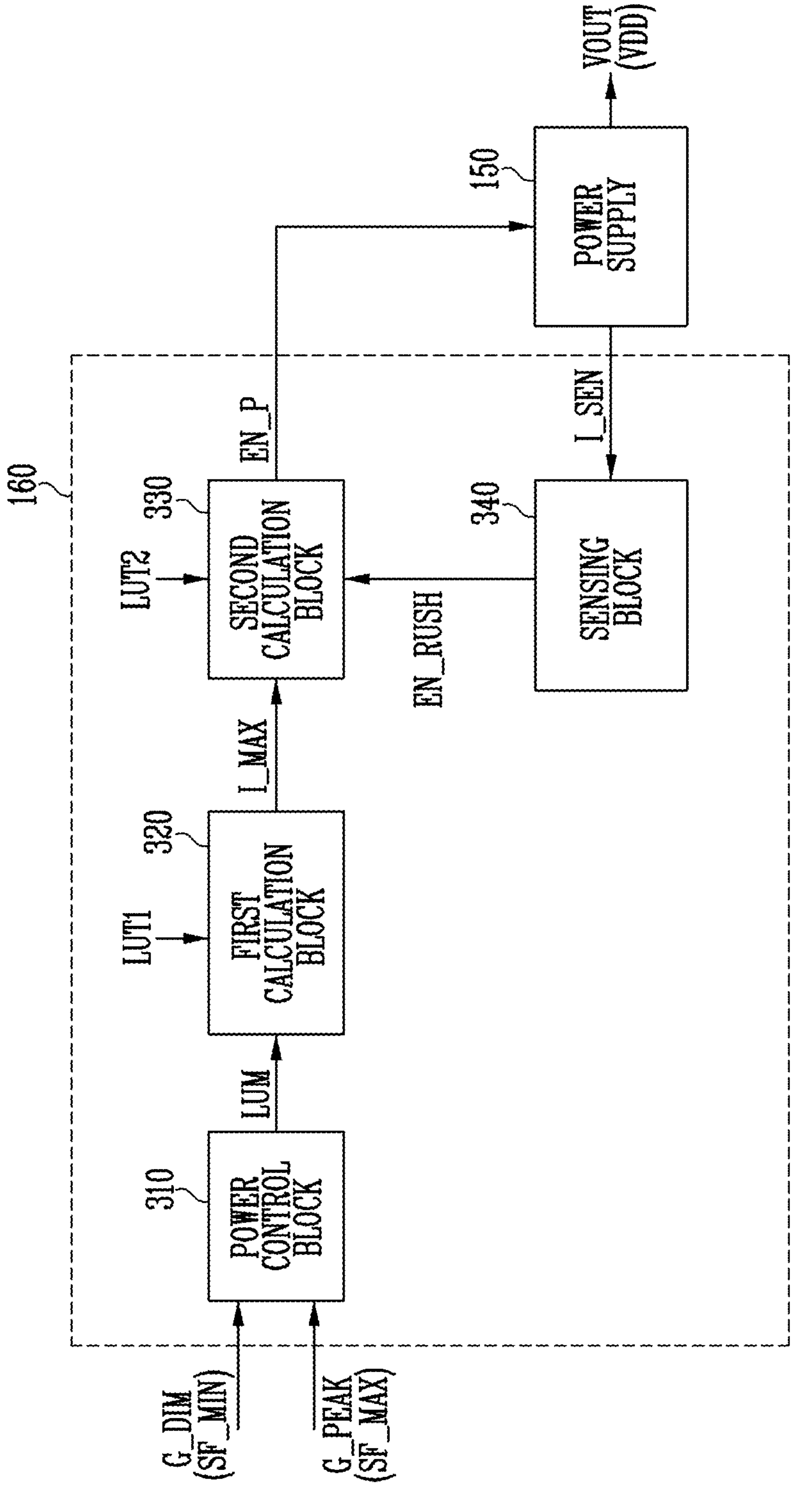
FIGS. 13 and 14 are block diagrams illustrating embodiments of a power controller which, for example, may be included in the display device of FIG. 2.
Figure 14:
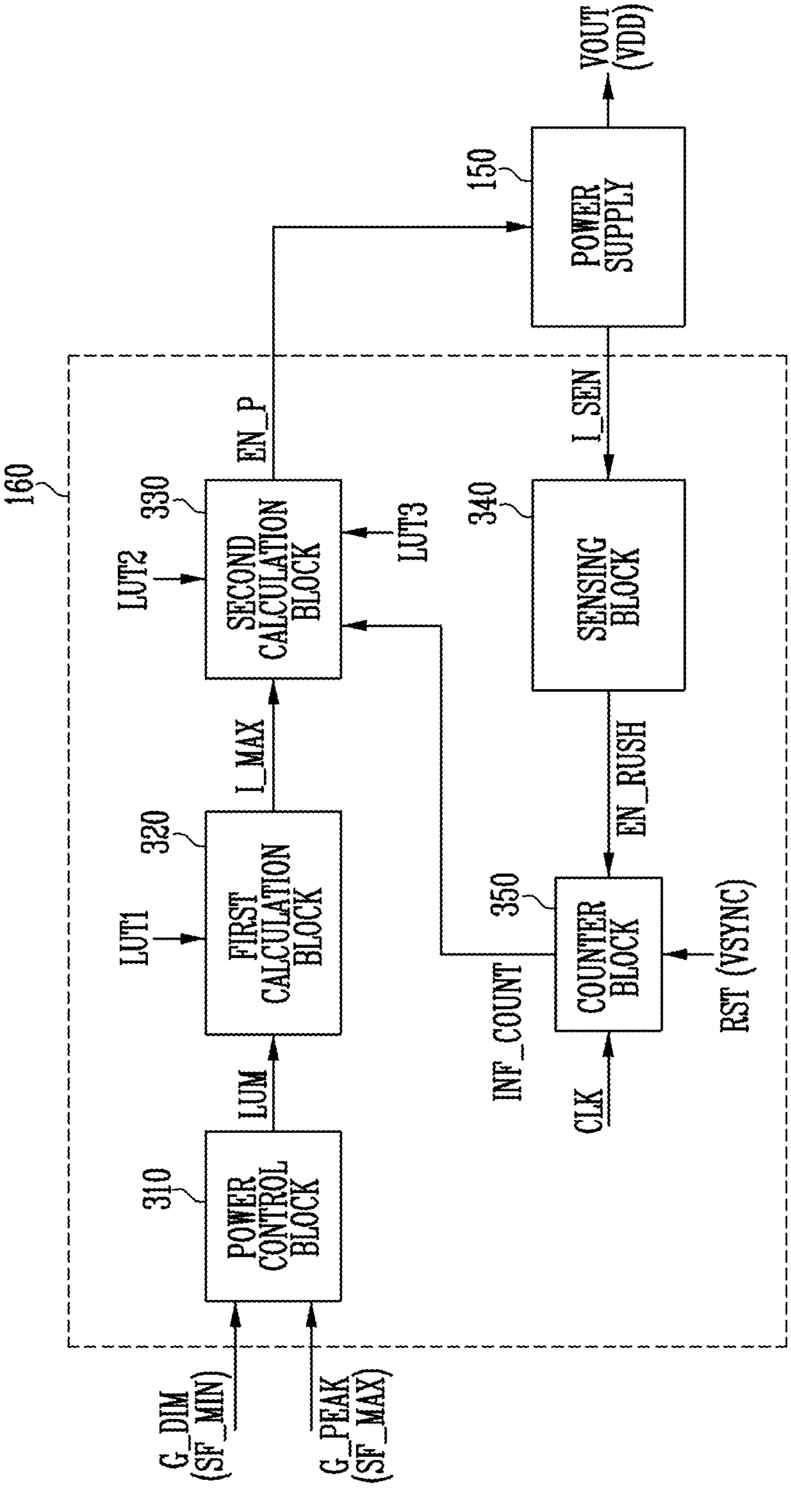
Figure 16:
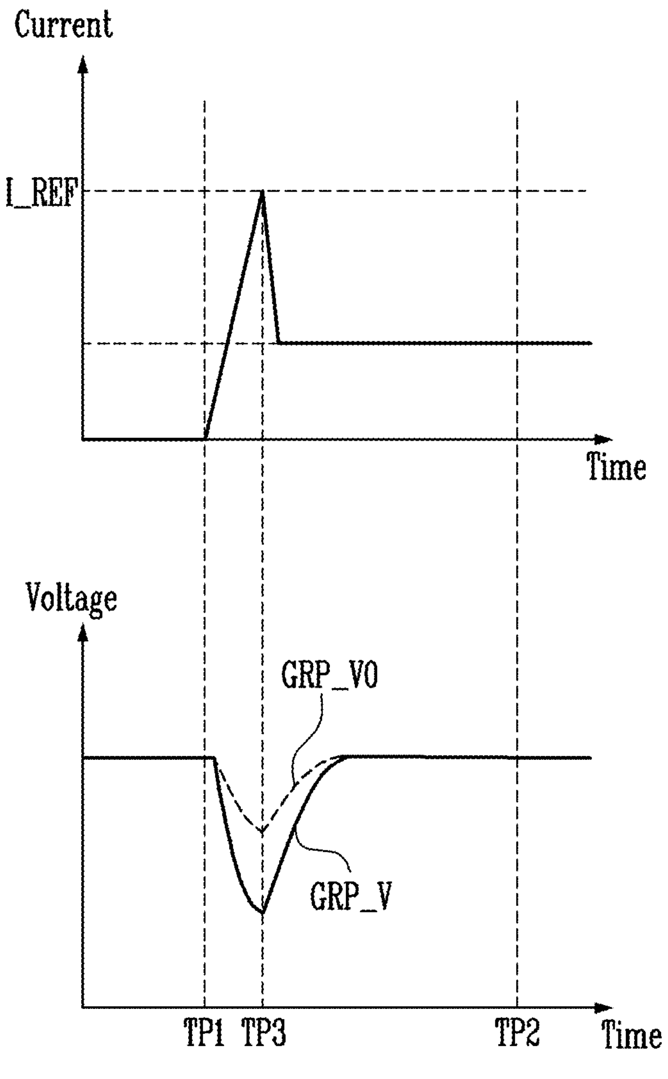
FIGS. 16 and 17 are diagrams illustrating voltage drop according to a current change amount.
Figure 17:
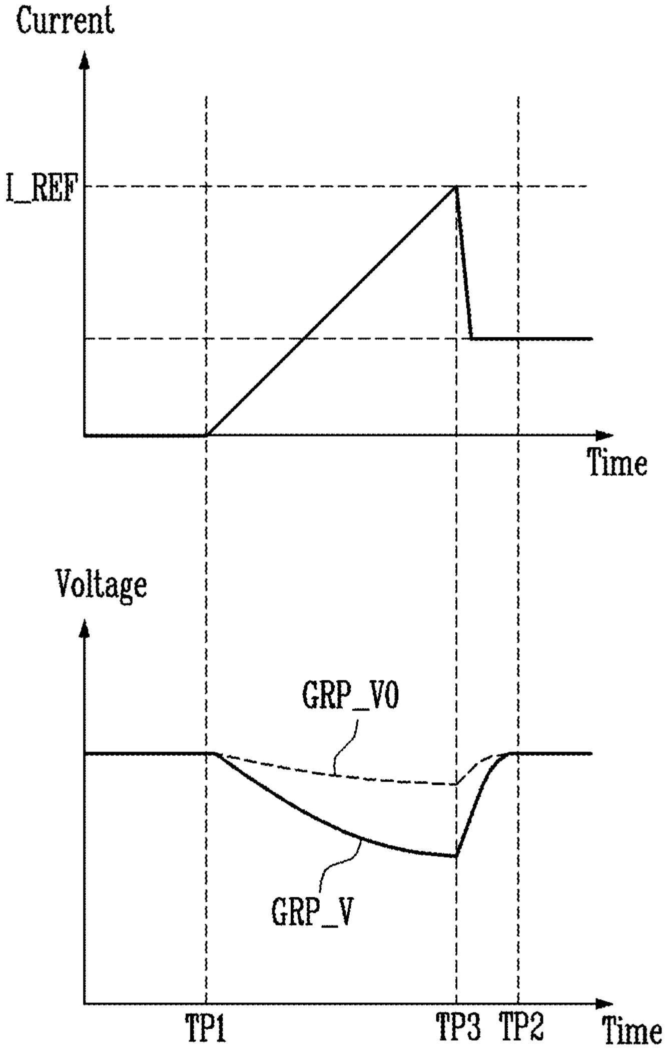

FIGS. 13 and 14 are block diagrams illustrating an embodiment of the power controller 160 included in the display device of FIG. 2. For convenience of description, the power supply 150 is further shown in FIGS. 13 and 14. FIG. 15 is a diagram illustrating an operation for each mode of the power controller of FIGS. 13 and 14. FIGS. 16 and 17 are diagrams illustrating a voltage drop according to a current change amount.

Referring to FIG. 13, the power controller 160 may include a power control block 310, a first calculation block 320, a second calculation block 330, and a sensing block 340. In one embodiment shown in FIG. 14, the power controller 160 may further include a counter block 350. At least a portion of the power control block 310, the first calculation block 320, the second calculation block 330, the sensing block 340, and the counter block 350 may be implemented as a combination of logic operation elements (or logic elements). The logic operation elements may be implemented in hardware, software, or a combination thereof in the timing controller 140 and the power supply 150. For example, the power control block 310, the first calculation block 320, and the second calculation block 330 may be included in the timing controller 140, and the sensing block 340 and the counter block 350 may be included in the power supply 150.

The power control block 310 may extract a luminance LUM based on a dimming gain G_DIM and a peak gain G_PEAK. Here, the dimming gain G_DIM may correspond to a minimum value SF_MIN of the scaling factor, and the peak gain G_PEAK may correspond to the maximum value SF_MAX of the scaling factor. A full white luminance (or a maximum luminance) may be determined by the dimming gain G_DIM, and a peak white luminance may be determined by the peak gain G_PEAK.

The dimming gain G_DIM and the peak gain G_PEAK, or luminance setting information corresponding thereto, may be provided from an external device, e.g., a host or electronic device 1000. For example, the dimming gain G_DIM and the peak gain G_PEAK may be preset according to the image quality setting mode of the electronic device 1000 (e.g., refer to FIG. 18) including the display device 100 and may be provided from the processor 1010, but are not limited thereto. The luminance LUM may be a full white luminance.

The first calculation block 320 may extract the maximum current value I_MAX (e.g., a reference current that becomes the reference of the current limit) of the display unit 110 based on the extracted luminance LUM. The reference current may be a predetermined stored value. For example, the first calculation block 320 may determine the maximum current I_MAX using a first lookup table LUT1 including information on the maximum current I_MAX preset for each luminance LUM. The first lookup table LUT1 may be stored in a memory device (of the display unit 110 or electronic device 1000) or the like and provided to the first calculation block 320.

The second calculation block 330 may generate the power control signal EN_P based on the extracted maximum current I_MAX. For example, the second calculation block 330 may generate the power control signal EN_P using another stored value. For example, the second calculation block 330 may generate the power control signal EN_P using a second lookup table LUT2 including information on a preset mode for each maximum current I_MAX. The second lookup table LUT2 may be stored in a memory device or the like and provided to the second calculation block 330.

FIG. 15 shows a table containing example values illustrating how the power controller 160 may operate based on power supply 150 shown, for example, in FIG. 4.

Referring to FIG. 15, for example, when a peak luminance of the display device 100 (containing four selectively activated converters CNV1 to CNV4) is 1000 nit, the power control block 310 may determine the luminance LUM of 400 nit based on the minimum scaling factor Min SF of 0.4 (that is, the minimum value SF_MIN). The first calculation block 320 may determine the maximum current I_MAX as 32 A, where the allowable current of each converter is 8 A, and the second calculation block 330 may select the first mode which supports 4-phase operation of the power supply 150. In this case, the second calculation block 330 may provide the power control signal EN_P corresponding to the first mode to the power supply 150, and the power supply 150 may generate the output voltage VOUT (or the first power voltage VDD) by activating all four converters (e.g., refer to FIG. 4) using the first to fourth switching control signals SW1 to SW4.

For example, when the power control block 310 determines the luminance LUM of 300 nit based on the minimum scaling factor Min SF of 0.3, the first calculation block 320 may determine the maximum current I_MAX as 24 A, and the second calculation block 330 may select the second mode which supports 3-phase operation of the power supply 150. In this case, the second calculation block 330 may provide the power control signal EN_P corresponding to the second mode to the power supply 150. In response to the power control signal EN_P, the power supply 150 may generate the output voltage VOUT (or the first power voltage VDD) by activating three converters using the first to third switching control signals SW1 to SW3.

For example, when the power control block 310 determines the luminance LUM of 200 nit based on the minimum scaling factor Min SF of 0.2, the first calculation block 320 may determine the maximum current I_MAX as 16 A, and the second calculation block 330 may select the third mode which supports 2-phase operation of the power supply 150. In this case, the second calculation block 330 may provide the power control signal EN_P corresponding to the third mode to the power supply 150, and the power supply 150 may generate the output voltage VOUT (or the first power voltage VDD) by activating two converters using the first and second switching control signals SW1 and SW2.

For example, when the power control block 310 determines the luminance LUM of 100 nit based on the minimum scaling factor Min SF of 0.1, the first calculation block 320 may determine the maximum current I_MAX as 8 A, and the second calculation block 330 may select the fourth mode which supports 1-phase operation of the power supply 150. In this case, the second calculation block 330 may provide the power control signal EN_P corresponding to the fourth mode to the power supply 150, and the power supply 150 may generate the output voltage VOUT (or the first power voltage VDD) by activating one converter using the first switching control signal SW1.

As described above, the power controller 160 may reduce power loss by adjusting the maximum number of activated converters of the power supply 150 correspondingly to the maximum current according to the current limit function of the timing controller 160.

The sensing block 340 may sense a current output through the output terminal OUT (e.g., refer to FIG. 4) of the power supply 150 (or a power generation block), or may obtain a sensing current I_SEN. For example, the sensing block 340 may include a current sensor. The sensing current I_SEN may be included in the overcurrent signal INF_OC (e.g., refer to FIG. 2), but is not limited thereto.

In an embodiment, the sensing block 340 may compare the sensed current I_SEN output from the power supply 150 with the reference current I_REF and output a comparison result EN_RUSH. Here, the reference current I_REF may be one of the maximum currents I_MAX1 to I_MAX4 (e.g., refer to FIG. 10), e.g., 32 A to 8 A. For example, in the first mode, the reference current may be the first maximum current I_MAX1, and in the second mode, the reference current I_REF may be the second maximum current I_MAX2. However, the reference current I_REF is not limited thereto, and for example, the reference current I_REF may be set to be less than a corresponding maximum current in another embodiment. When the sensing block 340 is included in the power supply 150, the comparison result EN_RUSH may be included in the overcurrent signal INF_OC (e.g., refer to FIG. 2).

For example, when the sensing current I_SEN is greater than or equal to the reference current I_REF, it may be determined that the overcurrent or the inrush current is generated. Thus, the sensing block 340 may output a comparison result EN_RUSH having a value of a first level (for example, a high level). When the sensing current I_SEN is less than the reference current, it may be determined that the overcurrent is not generated or the current limit function is normally applied. Thus, the sensing block 340 may output a comparison result EN_RUSH having a value of a second level (for example, a low level).

The second calculation block 330 may generate the power control signal EN_P based on the comparison result EN_RUSH having the value of the first level, indicating an overcurrent condition. For example, to compensate this overcurrent condition, the second calculation block 330 may control the power supply 150 to operate in a reduced phase (or different mode) in response to the comparison result EN_RUSH. For example, the second calculation block 330 may control the power supply 150 to perform the 3-phase operation of the second mode from the 4-phase operation of the first mode in response to the comparison result EN_RUSH. As another example, the second calculation block 330 may control the power supply 150 to perform 2-phase operation of the third mode or 1-phase operation of the first mode from the 3-phase operation of the second mode in response to the comparison result EN_RUSH. In this example, it is shown that the second calculation block 330 controls the power supply 150 to operate in a mode (and phase) that is reduced by one. However, in other embodiments the second calculation block 330 may control the power supply 150 to operate in a mode (and phase) that is reduced by two or more.

Referring to FIG. 16, a graph is shown including a voltage curve GRP_V and a reference voltage curve GRP_V0. The voltage curve GRP_V represents a case where a mode change according to the overcurrent is applied (for example, a case where the number of phases or activated converters is reduced by 1). The reference voltage curve GRP_V0 represents a case where the mode change is not applied. For example, the reference current I_REF may be about 20 A, and a voltage (that is, the first power voltage VDD) may be about 24 V. When the mode change is not applied, a voltage drop may occur due to the overcurrent and the voltage at the third time point TP3 may be about 22 V according to the reference voltage graph GRP_V0. In this case, power consumption may be about 440 W. When the mode change is applied, an additional voltage drop may occur and the voltage at the third time point TP3 may be about 21 V according to the voltage graph GRP_V1. In this case, power consumption may be about 420 W. Compared to the case where the mode change is not applied, power consumption may be reduced or improved by 20 W in the case where the mode change is applied.

In an embodiment, the second calculation block 330 may generate the power control signal EN_P based on a change amount (or a change rate) of the sensing current I_SEN. For example, the second calculation block 330 may control the power supply 150 to operate in a more reduced phase as the change amount (or the change rate) of the sensing current I_SEN is reduced.

Referring to FIG. 14, the counter block 350 may determine a time point when the overcurrent is generated based on one frame. For example, the counter block 350 may start to count the number of pulses of a reference clock signal CLK at a time point when a reference signal RST is provided, and may output a count result (that is, count information INF_COUNT) in response receiving the comparison result EN_RUSH having the value of the first (overcurrent) level. For example, the reference signal RST may be a vertical synchronization signal VSYNC indicating a start of one frame. Referring to FIGS. 16 and 17, for example, the vertical synchronization signal VSYNC may be provided at the first time point TP1 and the overcurrent may occur at the third time point TP3. The counter block 350 may output a result of counting the number of pulses of the reference clock signal CLK during a period between the first time point TP1 and the third time point TP3. By counting the number of pulses of the reference clock signal CLK, the counter block 350 is able to calculate the time between the first time point TP1 and the third time point TP3.

The second calculation block 330 may generate the power control signal EN_P based on the count information INF_COUNT. For example, the power control signal EN_P may be generated using a third lookup table LUT3 including information on a preset mode change according to the count information INF_COUNT. The third lookup table LUT3 may be stored in a memory device or the like and provided to the second calculation block 330.

FIG. 17 shows a graph including a voltage curve GRP_V and a reference voltage graph GRP_V0. Referring to FIG. 17, the voltage curve GRP_V represents a case where a mode change according to the overcurrent is applied, and the reference voltage curve GRP_V0 represents a case where the mode change is not applied. For example, the reference current I_REF may be about 20 A, and a voltage (that is, the first power voltage VDD) may be about 24 V. When the mode change is not applied, a voltage drop may occur due to the overcurrent, but a size of the voltage drop is relatively small. The voltage at the third time point TP3 according to the reference voltage curve GRP_V0 may be about 23.6 V. In this case, power consumption may be about 472 W. When the mode change is applied (for example, when the phase is reduced by two or more or when two or more converters are deactivated), a large voltage drop may occur and the voltage at the third time point TP3 according to the first voltage curve GRP_V1 may be about 22 V. In this case, power consumption may be about 440 W. Compared to the case where the mode change is not applied, the power consumption may be reduced or improved by 32 W in the case where the mode change is applied. Meanwhile, as described with reference to 16, when the number of phases or activated converters is reduced by 1, a voltage drop of about 1 V and a power reduction of about 20 W may occur. Compared to the embodiment of FIG. 16, power consumption may be further reduced or improved to an appropriate level according to the embodiment of FIG. 17.

For example, the second calculation block 330 may reduce the number of phases or activated converters by 1 when a value of the count information INF_COUNT (that is, the time between the first time point TP1 and the third time point TP3) is less than or equal to the first reference value (or a first reference time), and may further reduce the number of phases or activated converters by 1 (for example, reduce by a total of 2) when the value of the count information INF_COUNT is greater than the first reference value. When the value of the count information INF_COUNT is greater than a second reference value, the number of phases or activated converters may be reduced by one more (for example, reduce by a total of three). That is, the second calculation block 330 may further reduce the number of phases or activated converters as an overcurrent occurrence time is later.

Figure 18:
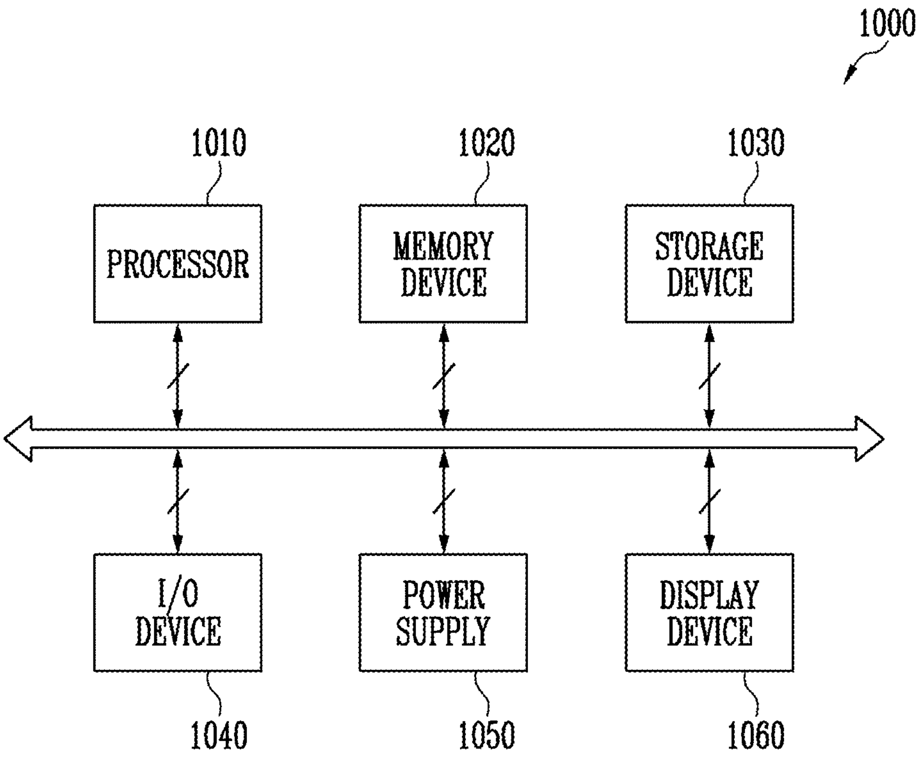
FIG. 18 is a block diagram illustrating an electronic device according to embodiments.

FIG. 18 is a block diagram illustrating the electronic device 1000 according to embodiments. The electronic device 1000 may be implemented, for example, as a television, a tablet PC, a navigation device, a smart phone, a mobile phone, a video phone, an e-book reader, a desktop PC, a laptop PC, a netbook computer, a workstation, a server, a PDA, a portable multimedia player (PMP), an MP3 player, a medical device, a camera, a wearable device, or the like.

Referring to FIG. 18, the electronic device 1000 may include a processor 1010, a memory device 1020, a storage device 1030, an input/output device 1040, a power supply 1050, and a display device 1060. The display device 1060 may be the display device 100 of FIGS. 1 and 2. The electronic device 1000 may further include several ports that may communicate with a video card, a sound card, a memory card, a USB device, and the like, or communicate with other systems.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, and the like. According to an embodiment, the processor 1010 may also be connected to an expansion bus such as a peripheral component interconnect (PCI) bus. In an embodiment, the processor 1010 may have various image quality setting modes and may provide luminance setting information (for example, the dimming gain G_DIM and the peak gain G_PEAK (e.g., refer to FIG. 13)) according to the image quality setting mode to the display device.

The memory device 1020 may store information and data to support operation of the electronic device 1000. For example, the memory device 1020 may store the lookup tables LUT1, LUT2, and LUT3 as previously described, the memory device 1020 may include a nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM), and a ferroelectric random access memory (FRAM) device, and/or a volatile memory device such as a dynamic random access memory (DRAM) device, a static random access memory (SRAM) device, a mobile DRAM and device.

The storage device 1030 may include a solid state drive (SSD), a hard disk drive (HDD), a CD-ROM, and the like.

The input/output device 1040 may include an input device such as a keyboard, a keypad, a touchpad, a touchscreen, and a mouse, and an output means such as a speaker, and a printer. According to an embodiment, a display device 1060 may be included in the input/output device 1040.

The power supply 1050 (or a power supply device) may supply power to support operation of the electronic device 1000. For example, the power supply 1050 may be a power management integrated circuit (PMIC). For example, the power supply 1050 may generate a voltage of 32 V DC using 220 V AC. For example, the power supply 1050 may include an AC-DC converter. A voltage generated in the power supply 1050 (or a first power supply) may be provided to the power supply 150 of FIG. 2 (or a second power supply).

The display device 1060 may display an image corresponding to visual information of the electronic device 1000. At this time, the display device 1060 may be an organic light emitting display device or a quantum dot light emitting display device, but is not limited thereto. The display device 1060 may be connected to other components through the above-described buses or another communication link.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, blocks, generators, logic, drivers, and other signal generating and signal processing features of the embodiments disclosed herein may be implemented, for example, in non-transitory logic that may include hardware, software, or both. When implemented at least partially in hardware, the controllers, processors, devices, modules, units, blocks, generators, logic, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, devices, modules, units, blocks, generators, logic, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosures. The embodiments may be combined to form additional embodiments.

What is claimed is:

1. A display device comprising:

a display panel including a pixel;

a power supply configured to receive a first power voltage through an input terminal and output a second power voltage supplied to the display panel via an output terminal;

the power supply includes a plurality of converters connected between the input terminal and the output terminal; and a power controller configured to vary an allowable current of the power supply by comparing a current output through the output terminal with a reference current and controlling the plurality of converters, wherein the power controller decreases the allowable current of the power supply in response to the current exceeding the reference current.

2. The display device according to claim 1, wherein the power controller is configured to adjust the allowable current based on a change rate of the current.

3. The display device according to claim 2, wherein the power controller is configured to decrease the allowable current as the change rate of the current decreases.

4. The display device according to claim 1, wherein:
the power controller is configured to adjust a number of activated converters among the plurality of converters by comparing the current with the reference current, and
the allowable current of the power supply is varied by the power controller according to the number of the activated converters.

5. The display device according to claim 4, wherein:
each of the converters includes at least one transistor and at least one inductor,
switching control signals having a same waveform and different phases are applied to the activated converters, and
the at least one transistor is toggled between an on state and an off state in response to a corresponding switching control signal among the switching control signals.

6. The display device according to claim 5, wherein the power supply includes four converters mutually connected in parallel.

7. The display device according to claim 4, wherein the power controller is configured to:
sense the current using a current sensor, and
decrease the number of the activated converters in response to the current exceeding the reference current.

8. The display device according to claim 7, wherein the power controller is configured to adjust the number of the activated converters based on the change rate of the current.

9. The display device according to claim 8, wherein the power controller is configured to decrease the number of the activated converters as the change rate of the current decreases.

10. The display device according to claim 8, wherein:
the display panel displays a frame image for each frame period,
the power controller is configured to calculate a time between a time point when the current exceeds the reference current and a start time point of the frame period using a counter, and
the power supply is configured to decrease the number of the activated converters as the time increases.

11. The display device according to claim 4, further comprising:
a controller configured to output image data corresponding to input image data; and
a data driver configured to provide a data signal corresponding to the image data to the pixel,
wherein the controller is configured to convert the input image data into the image data using a scaling factor, and set the scaling factor so that the current according to the input image data does not exceed the reference current.

12. The display device according to claim 11, wherein:
the controller is configured to set the scaling factor based on input image data of a first time point, convert input image data of a second time point after the first time point into the image data using the scaling factor, and
the power supply is configured to adjust the number of the activated converters in a period between the first time point and the second time point.

13. The display device according to claim 11, wherein the power controller is configured to adjust a maximum number of the activated converters among the converters based on the reference current.

14. An electronic device comprising:
a processor configured to provide input image data;
a display device configured to display an image based on the input image data; and
a power supply device configured to supply power to the display device, wherein the display device comprises:
a display panel including a pixel;
a power supply configured to receive a first power voltage through an input terminal and output a second power voltage supplied to the display panel to an output terminal; and
a power controller configured to vary an allowable current of the power supply by comparing a current output through the output terminal with a reference current,
wherein:
the power supply includes converters mutually connected in parallel between the input terminal and the output terminal,
the power controller is configured to adjust a number of activated converters among the converters by comparing the current with the reference current, and
the allowable current of the power supply is varied according to the number of the activated converters.

15. The electronic device according to claim 14, wherein the power controller is configured to:
sense the current using a current sensor, and
decrease the number of the activated converters in response to the current exceeding the reference current.

16. The electronic device according to claim 14, wherein:
the processor is configured to provide information indicative of the reference current to the display device, and
the power controller is configured to adjust the maximum number of the activated converters among the converters based on the reference current.

17. A display device comprising:
a display panel including a pixel;
a controller configured to output image data corresponding to input image data;
a data driver configured to provide a data signal corresponding to the image data to the pixel; and
a power supply configured to receive a first power voltage through an input terminal and output a second power voltage supplied to the display panel to an output terminal, wherein:
the controller is configured to convert the input image data into the image data using a scaling factor, and set the scaling factor so that a current according to the input image data does not exceed a reference current, and
the power supply is configured to vary an allowable current of the power supply based on the reference current.

18. The display device according to claim 17, wherein:
the power supply includes converters mutually connected in parallel between the input terminal and the output terminal, and
the allowable current of the power supply is varied by the power supply according to a number of activated converters among the converters.

* * * * *